US009847956B2

(12) United States Patent
Brecx

(10) Patent No.: US 9,847,956 B2
(45) Date of Patent: Dec. 19, 2017

(54) SYSTEMS AND METHODS FOR MANAGING ELECTRONIC REQUESTS FOR PHOTOGRAPHS AND MULTIMEDIA CONTENT, AND ENABLING ELECTRONIC SOCIAL SHARING THEREOF

(71) Applicant: Lionel Brecx, New York, NY (US)

(72) Inventor: Lionel Brecx, New York, NY (US)

(73) Assignee: Junglo LLC, New York, NY (US)

( * ) Notice: Subject to any disclaimer, the term of this patent is extended or adjusted under 35 U.S.C. 154(b) by 0 days.

(21) Appl. No.: 15/142,560

(22) Filed: Apr. 29, 2016

(65) Prior Publication Data

US 2016/0323219 A1 Nov. 3, 2016

Related U.S. Application Data

(60) Provisional application No. 62/266,857, filed on Dec. 14, 2015, provisional application No. 62/248,919, (Continued)

(51) Int. Cl.
*G06F 15/16* (2006.01)
*H04L 12/58* (2006.01)
*G06Q 50/00* (2012.01)

(52) U.S. Cl.
CPC ............ *H04L 51/10* (2013.01); *G06Q 50/01* (2013.01); *H04L 51/08* (2013.01); *H04L 51/32* (2013.01)

(58) Field of Classification Search
CPC .............................. H04L 51/32; H04L 51/046
(Continued)

(56) References Cited

U.S. PATENT DOCUMENTS 8,544,046 B2 * 9/2013 Gran ................ G06F 17/30038 709/216
2007/0190995 A1 8/2007 Wang et al.
(Continued)

FOREIGN PATENT DOCUMENTS

WO WO 2011/005217 A2 1/2011

OTHER PUBLICATIONS

Chao-Lieh, Chen et al., "Scalable and Autonomous Mobile Device-Centric Cloud for Secured D2D Sharing", Correct System Design, XP055286438, vol. 8909, pp. 177-189, Jan. 1, 2015.
(Continued)

*Primary Examiner* — Hua Fan
(74) *Attorney, Agent, or Firm* — Bookoff McAndrews, PLLC

(57) ABSTRACT

Systems and methods are disclosed for managing electronic requests for photographs and other multimedia content by receiving, from a first user's mobile application, a request to receive multimedia content from a second user's mobile application, adding the request to receive multimedia content from the mobile application of the second user device to a queue of pending requests associated with the second user, the queue of pending requests including any requests for multimedia content received by the mobile application of the second user device from one or more other users, and prompting a second user device to include generated or retrieved multimedia content either in response to the request or one of more of the pending requests in the queue. The first or second user mobile application may enable managing electronic requests using a user interface displaying a list of requested, sent, and/or received multimedia content.

20 Claims, 31 Drawing Sheets

Related U.S. Application Data filed on Oct. 30, 2015, provisional application No. 62/183,184, filed on Jun. 22, 2015, provisional application No. 62/154,473, filed on Apr. 29, 2015.

(58) Field of Classification Search
USPC .......................................................... 709/206
See application file for complete search history.

(56) References Cited

U.S. PATENT DOCUMENTS

| | | | | |
|---|---|---|---|---|
| 2010/0095332 | A1* | 4/2010 | Gran ................. | G06F 17/30038 725/93 |
| 2010/0106781 | A1 | 4/2010 | Gupta | |
| 2011/0014972 | A1* | 1/2011 | Herrmann .......... | G06Q 30/0224 463/25 |
| 2014/0006483 | A1 | 1/2014 | Garmark et al. | |

OTHER PUBLICATIONS

International Search Report and Written Opinion for Application No. PCT/IS2016/030135 , dated Jul. 14, 2016.

* cited by examiner

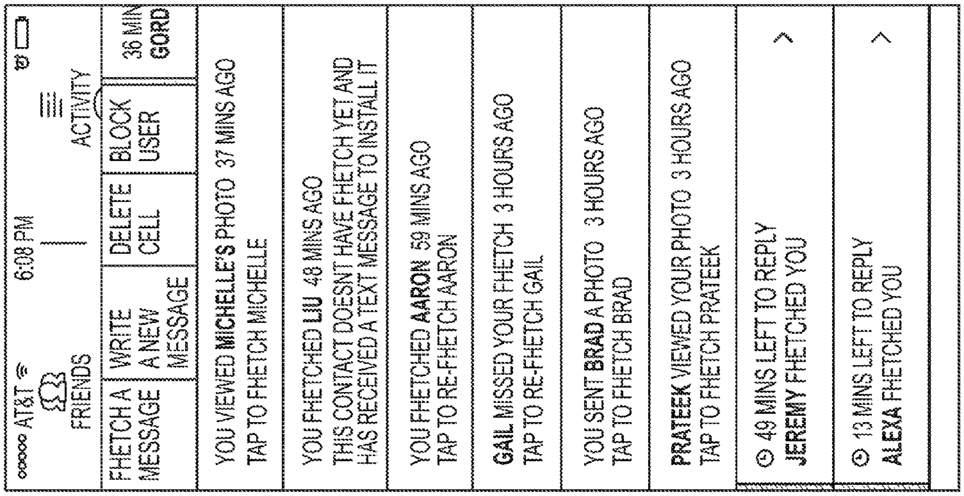

FIG. 16G oooooo AT&T 6:08 PM
FRIENDS ACTIVITY

| FHETCH A | WRITE | DELETE | BLOCK | 36 MIN |
| MESSAGE | A NEW | CELL | USER | GORD |
| | MESSAGE | | | |

YOU VIEWED MICHELLE'S PHOTO 37 MINS AGO
TAP TO FHETCH MICHELLE

YOU FHETCHED LIU 48 MINS AGO
THIS CONTACT DOESN'T HAVE FHETCH YET AND
HAS RECEIVED A TEXT MESSAGE TO INSTALL IT

YOU FHETCHED AARON 59 MINS AGO
TAP TO RE-FHETCH AARON

GAIL MISSED YOUR FHETCH 3 HOURS AGO
TAP TO RE-FHETCH GAIL

YOU SENT BRAD A PHOTO 3 HOURS AGO
TAP TO FHETCH BRAD

PRATEEK VIEWED YOUR PHOTO 3 HOURS AGO
TAP TO FHETCH PRATEEK

⊙ 49 MINS LEFT TO REPLY  ∧
JEREMY FHETCHED YOU

⊙ 13 MINS LEFT TO REPLY  ∧
ALEXA FHETCHED YOU

---

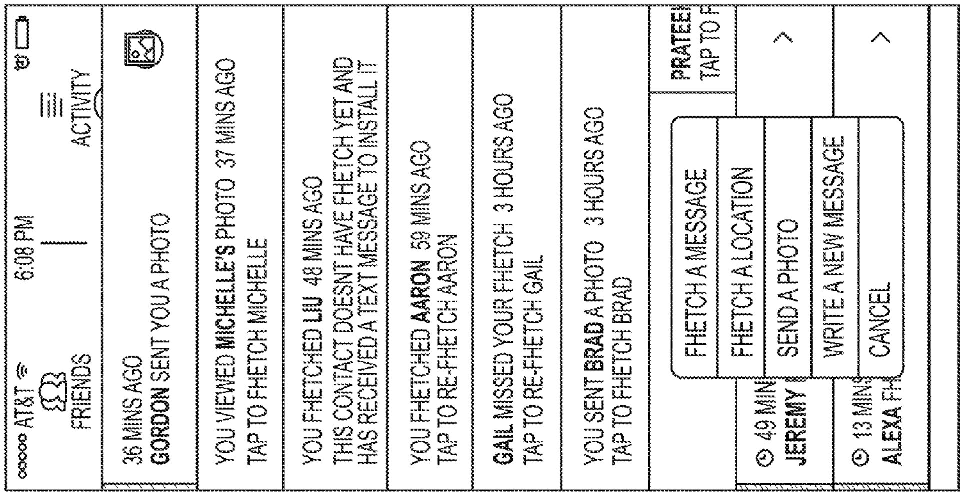

FIG. 16H oooooo AT&T 6:08 PM
FRIENDS ACTIVITY

36 MINS AGO
GORDON SENT YOU A PHOTO

YOU VIEWED MICHELLE'S PHOTO 37 MINS AGO
TAP TO FHETCH MICHELLE

YOU FHETCHED LIU 48 MINS AGO
THIS CONTACT DOESN'T HAVE FHETCH YET AND
HAS RECEIVED A TEXT MESSAGE TO INSTALL IT

YOU FHETCHED AARON 59 MINS AGO
TAP TO RE-FHETCH AARON

GAIL MISSED YOUR FHETCH 3 HOURS AGO
TAP TO RE-FHETCH GAIL

YOU SENT BRAD A PHOTO 3 HOURS AGO
TAP TO FHETCH BRAD

| | PRATEEK |
| | TAP TO F |

⊙ 49 MINS | FHETCH A MESSAGE |
JEREMY | FHETCH A LOCATION |
| SEND A PHOTO |
⊙ 13 MINS | WRITE A NEW MESSAGE |
ALEXA FH | CANCEL |

FIG. 26
FIG. 25
I WONDER
WHERE I AM...
USE FOR ALL LIVE FHETCHES
RETAKE
USE PHOTO
LOOK AT
ME NOW!
USE FOR ALL LIVE FHETCHES
RETAKE
USE PHOTO

SYSTEMS AND METHODS FOR MANAGING ELECTRONIC REQUESTS FOR PHOTOGRAPHS AND MULTIMEDIA CONTENT, AND ENABLING ELECTRONIC SOCIAL SHARING THEREOF

RELATED APPLICATIONS

This application claims benefit of priority under 35 U.S.C. §119 to U.S. Provisional Patent Application No. 62/154,473, filed on Apr. 29, 2015, U.S. Provisional Patent Application No. 62/183,184, filed on Jun. 22, 2015, U.S. Provisional Patent Application No. 62/248,919, filed on Oct. 30, 2015, and to U.S. Provisional Patent Application No. 62/266,857, filed on Dec. 14, 2015, the entireties of each of which are incorporated by reference herein.

FIELD OF DISCLOSURE

The present disclosure relates generally to electronic messaging, social networking, and sharing of multimedia content and, more particularly, to managing electronic requests for photographs and other multimedia content, and enabling the electronic social sharing thereof.

BACKGROUND

Mobile devices, such as smartphones and wearables, now allow users to perform a variety of tasks that traditionally required different types of devices. For example, a user may be able to use different client applications executable on the same mobile device to browse online content, play audio files, capture digital images, view directions for navigating between different locations or points of interest, and exchange messages between other users or computing devices via a mobile communication network. A user may also download and install various third-party client applications at the user's mobile device for viewing information, photos, and content related to friends, contacts, and/or general topics of interest. An application developer or affiliated service provider may use such a client application to provide different services to the user. Such services may include messaging services to which the user may subscribe in order to receive, for example, real-time message notifications and/or photos at the user's mobile device. The message notifications or photos that are sent (or "pushed") by a service provider for a particular client application may be displayed within a general notifications window via a user interface of the operating system on the user's mobile device, even when the client application may be closed or may not be actively executing on the mobile device when such notifications are received.

One exemplary application or "use-case" for message notifications and photos relates to sharing photos. Presently, mobile device users share photos with each other using two main techniques: direct messaging and publishing. Direct messaging of photos involves users proactively transmitting, sending, or "pushing," to one or more of their contacts and/or members of the public the one or more photos that the user desires to share. For example, a user may decide to share, and thereafter, proceed to share, a particular photo with a friend by texting (e.g., via MMS) the selected photo to that friend. Alternatively, a user may decide to share, and thereafter, proceed to share, a particular photo or photos with a group of friends, such as by a group text message thread (i.e., iMessage) or by a group-enabling mobile application (e.g., GroupMe, WhatsApp, etc.). Direct messaging of photos has several downsides, one of which is that direct message photo sharing generally occurs solely at the behest and initiation of the sender himself/herself (i.e., the person having a photo to share). Moreover, direct messaging of photos can be relatively isolated and insufficiently engaging.

In an attempt to overcome these and other limitations of direct messaging of photos, new online and mobile publishing techniques for sharing photos have become increasingly ubiquitous. Specifically, users are now subscribing to any number of social networks, messaging boards, mobile apps, etc., all in an attempt to find a desirable subset of friends, contacts, and/or members of the general public to whom they wish to share their photos. For example, many users now publish various photos using photo sharing software, such as Flickr, or using social networks, such as Facebook and/or Instagram. Like direct messaging of photos, publishing and social network sharing of photos also involve numerous downsides. In particular, as with direct messaging of photos, publishing of photos still occurs solely at the initiation of the publisher (i.e., the user having a photo or photos to share). Moreover, users are often tempted to publish idyllic or superlative versions of themselves and/or their experiences, as opposed to realistic photographs of their everyday lives. Still further, users are sometimes compelled to publish old or "stale" photos, leading to the adoption of the term "latergram," by which social media users acknowledge the staleness of the photos they are posting. Yet still further, users are often uncomfortable with the scope and audience associated with their publication-type photo sharing, despite the proliferation of numerous privacy and sharing options, or at least the appearance of privacy and sharing options. All of these concerns have led to the recognition of a phenomenon referred to as the "1% rule," by which it is assumed that a very small percentage of any network's or application's users are actually active contributors to that network's or application's content. A potential sharer of content may contribute to the "1% rule" because he or she is uncertain whether any of their contacts or members of the public have any desire to view the potential sender's multimedia content. This insecurity often leads to under-sharing by users who may have interesting and valuable content that other users desire to view.

Current platforms for photo sharing are not able to facilitate photo-sharing to its full potential (e.g., billions of photos won't see the day and won't be shared or be viewed), because these platforms have not solved certain existing problems, including defining the rules of usage within a photo-sharing platform.

For example, many users may not download an application that includes photo-sharing because the users may receive or think they would receive too many pictures on that application from certain friends/and or a specific community that the user may consider to be spam or simply overwhelming. Thus, there is a desire for a photo-sharing application that may eliminates or reduces spam and/or the notion of spam.

Additionally, many users (especially older generations) may not download an application because the apps may be or perceived to be too complicated to use and/or the users may not be 'tech savvy' enough for the application. Many grandchildren may love to receive occasional photos from their grandparents and many grandparents may love to be able to receive and be able to view photos with their grand-children but currently existing photo-sharing apps would need to be drastically simplified to become a multi-generational use. Thus, there is a desire for an application for photo-sharing application that may be simplified for users that may not be as tech-savvy.

Additionally, many users may not share photos because the users may not find what they are currently doing to be interesting enough to interest their audience, or because the users may be shy or insecure about sharing photos for depicting what they are doing. There is, therefore, a desire for an application that would get such users more inclined to send photos or multimedia content.

Additionally, even if a user does receive a request to send a photo and takes a photo, the user may be reluctant to send the photo because the photo may be bad. For example, the user may feel that he or she does not look great (e.g., the user has a bad hair day), the user may feel that the picture is boring, or that the lighting is not as good, etc.

Additionally, even if a user does receive a request the user may be reluctant to send a photo because the user may not have time or does not want to send a picture right away. There is a desire for an app that would allow a user to quickly and efficiently send a photo or respond to a photo request.

Additionally, many users do not share photos because they do not think about posting/sending photos because nobody is asking them to.

Additionally, many users do not want to send, to another user, a request to send a photo, because it may be socially awkward. For example, a user may not typically receive text messages from the friends or family members of the user on a regular basis asking the user to send them a picture of what the user is doing at the moment of the request. Even if the user himself or herself would like to know what a friend or family member is up to at the moment, the user may restrain himself or herself from sending the friend or family member a cumbersome text message of the type "hey what's up? Send me a picture of what you are doing right now". Furthermore the user may be too lazy to type such a text message each time the user wants a photo for each different person. There is, thus, a desire for an app that facilitates the request to send photo and removes or diminishes the social awkwardness involved with sending a request to share a photo.

There is also a desire for an app that may change the roles of traditional "lurkers" that exist in current photo-sharing platforms, so that the lurkers are no longer, as passive and/or so that the lurkers may become more engaged with other users on of the app.

Accordingly, to date, no suitable systems or methods exist for overcoming the above-referenced drawbacks of traditional direct message and publication-type sharing of multimedia content, such as photos. The present disclosure is directed to overcoming these above-referenced drawbacks, among other things.

SUMMARY

According to certain aspects of the present disclosure, systems and methods are disclosed for managing electronic requests for photographs and multimedia content, and enabling the electronic social sharing thereof.

One method includes: receiving, from a mobile application of a first user device, a request to receive multimedia content from a mobile application of a second user device, the request including an identifier of the first user device and an identifier of the second user device; adding the request to receive multimedia content from the mobile application of the second user device to a queue of pending requests associated with the second user device, the queue of pending requests including any requests for multimedia content received by the mobile application of the second user device from one or more other user devices; selecting one or more requests from the queue of pending requests associated with the second user device to send to a mobile application of the second user device, the queue now including the added request from the first user device to receive multimedia content from the second user device; sending, to the mobile application of the second user device, one or more of the selected requests to receive multimedia content from the mobile application of the second user device, in response to the request from the mobile application of the first user device and/or any one or more pending requests in the queue associated with the second user device; receiving, from the mobile application of the second user device, one or more responses to the one or more requests to receive multimedia content; if a response to a request to receive multimedia content was an acceptance of the request to receive multimedia content, enabling a user of the second user device, through the mobile application of the second user device, to either generate a multimedia content using the second user device, or retrieve a multimedia content from storage of the second user device; prompting, through the mobile application of the second user device, the user of the second user device to either (i) include the generated or retrieved multimedia content in response to the request to receive multimedia content, or (ii) include the generated or retrieved multimedia content in response to one of more of the pending requests in the queue associated with the second user; sending the generated or retrieved multimedia content, over an electronic network, to the first user device and any one or more user devices associated with the one of more pending requests in the queue, depending on the one or more responses by the second user device to the prompting; and enabling a user of the first user device to see, listen to, and/or play the generated or retrieved multimedia content through the mobile application of the first user device, in response to the request to receive multimedia content from a mobile application of the second user device; and enabling a user of the first or second user device, through the mobile application of the first or second user device, to view notifications related to the requested, generated, sent, or received multimedia content, through a user interface that includes, at least, a list of the notifications related to requested, generated, sent, or received, multimedia content.

In accordance with another embodiment, a system for managing one or more requests for multimedia content between mobile devices, and enabling the electronic social sharing thereof, the system comprising: a data storage device storing instructions for managing one or more requests for multimedia content between mobile devices, and enabling the social sharing thereof; and a processor configured to execute the instructions to perform a method including the steps of: receiving, from a mobile application of a first user device, a request to receive multimedia content from a mobile application of a second user device, the request including an identifier of the first user device and an identifier of the second user device; adding the request to receive multimedia content from the mobile application of the second user device to a queue of pending requests associated with the second user device, the queue of pending requests including any requests for multimedia content received by the mobile application of the second user device from one or more other user devices; selecting one or more requests from the queue of pending requests associated with the second user device to send to a mobile application of the second user device, the queue now including the added request from the first user device to receive multimedia content from the second user device; sending, to the mobile application of the second user device, one or more of the selected requests to receive multimedia content from the mobile application of the second user device, in response to the request from the mobile application of the first user device and/or any one or more pending requests in the queue associated with the second user device; receiving, from the mobile application of the second user device, one or more responses to the one or more requests to receive multimedia content; if a response to a request to receive multimedia content was an acceptance of the request to receive multimedia content, enabling a user of the second user device, through the mobile application of the second user device, to either generate a multimedia content using the second user device, or retrieve a multimedia content from storage of the second user device; prompting, through the mobile application of the second user device, the user of the second user device to either (i) include the generated or retrieved multimedia content in response to the request to receive multimedia content, or (ii) include the generated or retrieved multimedia content in response to one of more of the pending requests in the queue associated with the second user; sending the generated or retrieved multimedia content, over an electronic network, to the first user device and any one or more user devices associated with the one of more pending requests in the queue, depending on the one or more responses by the second user device to the prompting; and enabling a user of the first user device to see, listen to, and/or play the generated or retrieved multimedia content through the mobile application of the first user device, in response to the request to receive multimedia content from a mobile application of the second user device; and enabling a user of the first or second user device, through the mobile application of the first or second user device, to view notifications related to the requested, generated, sent, or received multimedia content, through a user interface that includes, at least, a list of the notifications related to requested, generated, sent, or received, multimedia content.

In accordance with another embodiment, a non-transitory computer medium for use on a computer system containing computer-executable programming instructions for performing a method of managing one or more requests for multimedia content between mobile devices, and enabling the electronic social sharing thereof, the method comprising: receiving, from a mobile application of a first user device, a request to receive multimedia content from a mobile application of a second user device, the request including an identifier of the first user device and an identifier of the second user device; adding the request to receive multimedia content from the mobile application of the second user device to a queue of pending requests associated with the second user device, the queue of pending requests including any requests for multimedia content received by the mobile application of the second user device from one or more other user devices; selecting one or more requests from the queue of pending requests associated with the second user device to send to a mobile application of the second user device, the queue now including the added request from the first user device to receive multimedia content from the second user device; sending, to the mobile application of the second user device, one or more of the selected requests to receive multimedia content from the mobile application of the second user device, in response to the request from the mobile application of the first user device and/or any one or more pending requests in the queue associated with the second user device; receiving, from the mobile application of the second user device, one or more responses to the one or more requests to receive multimedia content; if a response to a request to receive multimedia content was an acceptance of the request to receive multimedia content, enabling a user of the second user device, through the mobile application of the second user device, to either generate a multimedia content using the second user device, or retrieve a multimedia content from storage of the second user device; prompting, through the mobile application of the second user device, the user of the second user device to either (i) include the generated or retrieved multimedia content in response to the request to receive multimedia content, or (ii) include the generated or retrieved multimedia content in response to one of more of the pending requests in the queue associated with the second user; sending the generated or retrieved multimedia content, over an electronic network, to the first user device and any one or more user devices associated with the one of more pending requests in the queue, depending on the one or more responses by the second user device to the prompting; and enabling a user of the first user device to see, listen to, and/or play the generated or retrieved multimedia content through the mobile application of the first user device, in response to the request to receive multimedia content from a mobile application of the second user device; and enabling a user of the first or second user device, through the mobile application of the first or second user device, to view notifications related to the requested, generated, sent, or received multimedia content, through a user interface that includes, at least, a list of the notifications related to requested, generated, sent, or received, multimedia content.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2B is a block diagram depicting the lines of communication between various system elements suitable for practicing an embodiment of the present disclosure. FIGS. 2C and 2D depict exemplary architectures for the server-side database design and the client-side database design, respectively;

DESCRIPTION OF THE EMBODIMENTS

Figure 1:
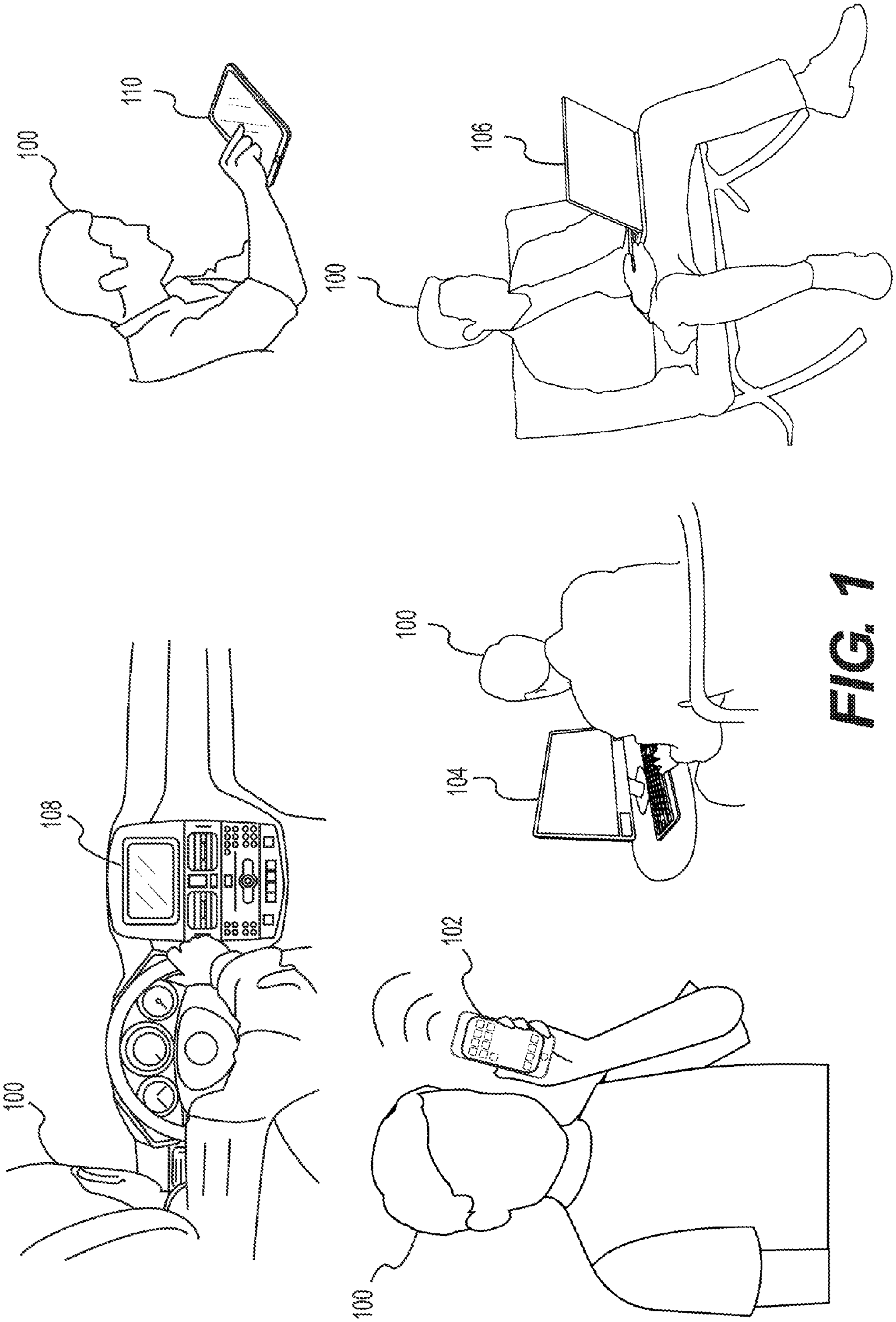
FIG. 1 is a composite depiction of the numerous ways by which a user may access an application for sharing multimedia content, such as photographs, according to one or more embodiments of the present disclosure.

The present disclosure relates to new systems and methods for sharing photographs and other multimedia content by requesting to be shown a photograph or other multimedia content created by a requestor's mobile device contact and/or social network contact. For purposes of illustration, according to one embodiment of the present disclosure, a first user might desire to know what the first user's friend or contact (i.e., a second user) is currently doing. The first user may open a mobile application on the first user's mobile device, and issue a request for the second user to show the first user a photograph or other multimedia content from the second user's mobile device. The first user may initiate the request by selecting indicia associated with the second user and/or by selecting a single user element associated with issuing the request. Upon initiating the request, a corresponding mobile application installed on the second user's mobile device may prompt the second user to respond to the first user's request. In one embodiment, the second user may be prompted to respond to the first user's request by receiving a push notification, a ping, an alarm, a text, and/or any other notification associated with the mobile application on the second user's mobile device. Upon responding to the prompt, the second user's mobile device may automatically initiate a sequence to prompt the second user to respond to the first user's request. For example, in one embodiment, the prompt may initiate a sequence to inform the second user of the first user's request, to solicit the second user's election to respond to or to ignore the first user's request, and if the second user elects to respond, to automatically initiate a sequence on the second user's mobile device to generate the multimedia content to be shared or retrieve, from storage, the multimedia content requested to be shared. For example, if the second user wishes to respond to the first user's request, then the second user's mobile device may be prompted by the mobile application to automatically access and launch the camera, microphone, etc., of the second user's mobile device.

Current platforms for photo sharing are not able to facilitate photo-sharing to its full potential (e.g., billions of photos won't see the day and won't be shared or be viewed), because these platforms have not solved certain existing problems, including defining the rules of usage within a photo-sharing platform.

The systems and methods of the present disclosure are able to overcome the shortcomings of current platforms for photo-sharing, for example, by protecting the user from spam and unsolicited photos and/or photo requests, without necessarily having to block users.

Furthermore, the present disclosure provide a photo-sharing app that is easy to use for all generations, for example, by drastically simplifying the app layout, user interface, and functionality.

Furthermore, the present disclosure allows users of a photo-sharing app to be more inclined to send photos or multimedia content, by enabling such users to be notified when other users want to receive a photo from them, and enabling the users to receive a ping or a request to share a photo of what they are up to. In addition, by making photos temporary, the present disclosure also provides a system and method for making the users of a photo-sharing app less reluctant to send a photo.

The present disclosure provides a system and method of streamlining the process of sharing photos, for example, by allowing a user to accept a request to share a photo, which will automatically open the camera of the user, making it quick and easy for the user to send a photo. In the event the person doesn't even have time or doesn't want to send a picture right away, the photo-sharing app of the present disclosure may allow the user to respond to the request to share a photo, at a later time (within a certain time frame).

The photo-sharing app of the present disclosure overcomes the problem of social awkwardness of users, for example, by providing an easy layout and user interface on which only one tap is needed to send a request to share a photo. The environment of the photo-sharing app helps in diminishing the social awkwardness of users for sharing photos and multimedia content, and may make the activity of sending and receiving requests to share photos and multimedia content more flattering.

The systems and methods of the present disclosure radically changes the roles of the traditional "lurkers" in the 1% rule or '90-9-1 principle' for photo-sharing platforms. In traditional and current photo sharing platforms, lurkers are passive. The photo-sharing app of the present disclosure obligates lurkers to become more active by initiating the exchange of sending or receiving photo requests. Thus, the portion of active initiators in the photo-sharing app become much larger than 1%.

Thus, in general, the present disclosure includes, among other things, a mobile application that enables users to ask each other to send them photos of what the other person is doing, seeing, or experiencing right now. Unlike traditional photo sharing techniques, the present disclosure involves bypassing the traditional reliance of determining when the sender of the photo desires to send or post photos. By contrast, the present disclosure involves initiating activity upon a first user wanting to know something about a second user, e.g., by requesting a real-time photograph or other multimedia content. It should be appreciated that the value of the multimedia content may be higher to the recipient because the recipient is receiving the content when they want it, as opposed to whenever a sender decides to share the content. Moreover, because the requests are for real-time photos, the transmitted photos may be more realistic, entertaining, and/or engaging. Moreover, the presently disclosed photo sharing application or mobile application may ease and facilitate the previously disclosed techniques by reducing the number, amount, and/or difficulty of keystrokes or interactions between users and their mobile devices. For example, an exemplary mobile application consistent with the present disclosure may enable a first user to tap just once on a touchscreen UI element to request a photo from their friend or contact (assuming the application is open). The recipient friend or contact may accept, reject, or delay the request with just one tap or swipe on a touchscreen UI element or choose to ignore the request. If the recipient friend or contact accepts the first user's request for multimedia content, e.g., a photo, then the recipient's mobile application may automatically launch the camera and/or microphone used to generate the requested real-time content. In one embodiment, if the recipient accepts the first user's request, then the recipient's mobile device and/or mobile application may automatically generate or retrieve, from storage, the requested content without any further action from the recipient. For example, assuming the sender and recipient have both opted-in to this arrangement and the recipient has accepted the sender's request, the recipient's mobile application could automatically take a photograph and/or screenshot/screengrab within some predefined time of the recipient accepting the sender's request. Alternatively, the mobile application could automatically open the recipient's camera application upon the recipient accepting the sender's request, and enable the recipient to take, discard, and/or replace a real-time photograph for sending to the sender in response to the request. In one embodiment, the present disclosure may be applicable to the sharing of content between parents and their children. Specifically, a parent may request that their child share with them a photo, location, or other multimedia content, and the child may be obliged to promptly provide their parent with a photo, location, or other multimedia content, for the purpose of providing the parent with peace of mind, or other parental and/or familial satisfaction.

Although the present disclosure generally describes the multimedia content being requested and shared as being, for example, a photograph, it should be appreciated that the requested multimedia content is contemplated herein as including any multimedia content. For example, in addition to or in the alternative to a photograph, a first user may request that the second user send the first user any of: a video, a sound clip, an audio recording, a touch sequence, a heartbeat, a health measurement, a sequence of frame captures, a forward or front-facing photograph, a backward or self-facing photograph, a combined forward or front-facing and backward or self-facing photograph collage, a "selfie," a mobile device screenshot, a mobile device location, a mobile device status, an amount of money, a physical measurement (e.g., temperature, speed, etc.), or any other multimedia content that is of interest to the first user and that is producible by the second user and/or the second user's mobile device. In one embodiment, users may select a song or part of a song, and associate said song or part of a song with any of the above referenced multimedia content (e.g., a photo) being requested by another user of the application.

In some aspects, the request by a first user of a second user may be referred to as a "fetch," or, more stylized, as a "fhetch." Thus, the present disclosure uses the terminology that a first user may "fetch" or "fhetch" a second user, as a proxy for any request for multimedia content that the first user may request of a second user. Any use of the words "fetch" or "fhetch," or variants thereof, should be construed broadly to encompass any electronic request, whether enabled by a mobile device, a mobile application, or otherwise. Moreover, the present disclosure describes how, at any given time, a first user may be sending one or more requests or fhetches to another user, and/or to a plurality of other users. At the same time, and/or asynchronously, the first user may be receiving one or more requests or fhetches from another user, and/or a plurality of other users. Thus, the present disclosure will describe various techniques for managing the receipt, display, sending, and handling of multiple requests or fhetches between vast networks of users over the Internet, including mobile telecommunications networks.

In some aspects of the present disclosure, users' requests or fhetches will be described as having an "expiration time" or any other parameter that may optionally cause the requests or fhetches to be time limited or ephemeral in nature. Specifically, any request or fhetch may be associated with an expiration time, such as a few seconds, a minute, a few minutes, an hour, a few hours, a day, a few days, and so on. In one exemplary embodiment, each fhetch lasts (i.e., remains active or "live") for only one hour. In one embodiment, the fhetch may never expire, and may remain pending in a user's inbox unless and/or until the recipient either responds or deletes the fhetch. In one embodiment, users may block fhetches by other users, silence, ignore, delay, and/or mute them based on one or more factors, such as the user's location, time of day, and so on. In yet another embodiment, users may be able to edit or revise photos before sending them in response to one or more pending fhetches. In one embodiment, users may claim money from another user using "fetch money." In yet another embodiment, users may receive points for the most sent fhetches, fhetch requests, and/or fhetch responses. Users may be ranked, sorted, and/or given with points, money, or other value based on how often and/or how quickly they respond to their friends requests.

In one embodiment of the present disclosure, the following logic describes the handling of requests or "fhetches" for multimedia content, such as photographs, between a subject user and another user "Brad." The logic highlights the simplicity and ease of access of the system and method for managing electronic requests for photographs and multimedia content ("fhetch app"). Specifically, if a mobile application consistent with the present disclosure displays the notification: "Brad fhetched you," then the application may first replace any previous live "Brad fhetched you", "You missed Brad's fhetch," and all "Brad viewed your photo" with the new "Brad fhetched you" notification. If "Brad fhetched you" expires, then the notification may become "You missed Brad's fhetch." If the notification "Brad fhetched you" is declined, then the notification may become "You missed Brad's fhetch." If the notification "Brad fhetched you" is accepted, and a photo is sent to Brad, then the notification may become "You sent Brad a photo." If the notification becomes "You fhetched Brad," then the notification may first replace and may remove any previous live notifications of "You fhetched Brad," "Brad Missed your fhetch," and "You viewed Brad's photo." If the notification "You fhetched Brad" expires, then the notification may become "Brad missed your fhetch." If the notification "You fhetched Brad" is declined, then the notification may become "Brad missed your fhetch." If the notification "You fhetched Brad" is accepted, and Brad sends a photo, then the notification may become "Brad sent you a photo." If the notification is "Brad sent you a photo," then the application may first replace and/or may remove all previous notifications of "Brad viewed your photo," "You viewed Brad's photo," "You fhetched Brad," and "Brad missed your fhetch." However, in some embodiments, the "You sent Brad a photo" may remain until they have been viewed. If the notification "Brad sent you a photo" is viewed, then the notification may become "You viewed Brad's photo" and may make any previous "You viewed Brad's photo" disappear. If the notification is "You sent Brad a photo," then the application may first replace and/or may remove all previous "You viewed Brad's photo", "Brad viewed your photo", "Brad fhetched you", and "You missed Brad's fhetch." However, the previous "Brad sent you a photo" may remain until it has been viewed. If the notification "You sent Brad a photo" is viewed, then the notification may become "Brad viewed your photo" and may make any previous "Brad viewed your photo" disappear. If Brad accepts the fhetch and opens the photo but nevertheless cancels, then the fhetch may remain live and may appear in an activity log. If Brad is taking a photo and has not previously taken or canceled the photo, then the activity log may reflect that "Brad is taking a photo." The abovementioned logic may also apply to the sharing of multimedia content other than photos (e.g., location, message, money, video, etc.). The abovementioned logic described using an exemplary user 'Brad' highlight the 'autoclean' and/or 'autosimplification' features of the cells in the activity bar, and add to the simplicity and ease of use of the fhetch app, by keeping only the essential and pertinent cells in the activity bar while getting rid of less interesting and/or old cells, and by linking the activity tab in a unique way to the friends tab to make it as little time consuming for the user to use. The 'autoclean' and/or 'autosimplification' features enhances the user experience by avoiding long lists of cells filled with obsolete entries or time logs, and by obviating the need for the user to scroll unnecessarily to be able to view pertinent entries. For example, if the activity tab notifies that a user has fhetched Brad, and the user decides to fhetch Brad again, the activity tab may be configured to only devote one cell to the activity of the user fhetching Brad (e.g., list only one instance of the activity). In another example, if an activity tab shows that a first user has sent or received a multimedia content from a second user, and the first user subsequently sends or receives the same multimedia content or same type of multimedia content from the second user, the activity tab may be configured to only devote one cell to the activity of the first user sending or receiving the same multimedia content or same type of multimedia content from the second user (e.g., list only one instance of the activity).

In some embodiments, when there is no data service and/or internet connection available and/or where the fhetch app must operate offline, the fhetch app may be designed to maximize the user experience, at least until data service or connection is reestablished. For example, after a user is notified that a data service and/or connection cannot be established (e.g., by informing the user of "could not retrieve activity timeline"), the user may be prompted with the option to "continue offline." If a user decides to continue offline, a user may be able to at least initiate activities, including but not limited to, viewing photos, writing comments, reading comments, replying to comments, accepting fhetch requests and taking pictures, and/or sending fhetch requests. Activities requiring data service or connection for execution (e.g., replying to comments, sending fhetch requests, etc.) may remain as pending to be sent until as soon as a data service or Internet connection is available. In such embodiments, the timestamp for each individual activity initiated during the offline period may be based on the time provided from the network (e.g., when the activity was initiated) rather than the time when a data service or connection became available for the activity to be completely executed). If the person has no service or is in airplane mode, then the timestamp may default to the next time when the network time is available, rather than the time at which the data may become available. On the receiver's end, the receiver may receive the time of the sender's activity from the timestamp based on the network time. Thus, if a fhetch request is sent during an absence of data service and/or connection, then the fhetch request may be sent as soon as data service and/or connection becomes available they are sent but the remaining period left to answer the fhetch request for the receiver may depend on the length of time after the network time at which the activity had been initiated by the sending user, whether or not the length of time includes time at which there was an absence of data service and/or connection. Thus, if a pending fhetch request had been timestamped (based on network time) as occurring more than 24 hours ago, and the fhetch request had been set to expire on or within 24 hours of being initiated, and there was no data service or connection for 24 hours, the receiver of the fhetch request may receive a "missed fhetch request".

In some embodiments, even in the absence of data service or connection, the sender's activity timeline may still be able to organize itself (e.g., by aligning the cells according to a particular order when tapped) without having to connect to the server. In one embodiment, the activity timeline may be able to organize itself based on the network time.

In one embodiment, a multimedia content, such as a photograph, sent in response to a fhetch request, may last for only a selected amount of time. For example, photo recipients may be prevented from keeping, downloading, screen capturing, or otherwise preserving received photos. In one embodiment, multimedia content may be sent with an expiration time, after which the shared multimedia content may disappear or diminish in quality. For example, after an expiration time, a shared photo may disappear or become blurry. In one exemplary embodiment, all shared photos may have a preset expiration time of 10 second, 20 seconds, or 30 seconds, for example, after which the shared photo will become blurry. In such an embodiment, a viewer of the expired photo may either exit back to the activity tab, or reply to the expired photo with another photo and/or with text. In any of the disclosed embodiments, recipients of multimedia content may "like," "favorite," "heart," "star," "tag," or otherwise select a multimedia content for special designation. In one embodiment, a user may designate multimedia content with special indicia either before or after a multimedia content has expired, i.e., while the photo is still clear, or even after the photo has become blurry.

In one embodiment, a photo and other multimedia content may be accompanied with a speech or thought bubble. For example, a photo sent in response to a fhetch request may contain a thought bubble, with the tail end of the thought bubble linked to the face of a person within the photo. The fhetchee may send text or other multimedia content (e.g., photo, video, sound, location, drawing, .gif file, etc.) within the speech or thought bubble expressing, for example, the said person's thoughts at the time the photo is shot. In one embodiment, the text or other multimedia content within the speech or thought bubble sent in response to fhetch requests may start a conversation thread. In another embodiment, a user may be able to select a number of different bubble designs or have the mobile application select an appropriate bubble design based on facial feature recognition.

Given that the present disclosure helps facilitate the sharing of multimedia content more readily, a number of embodiments may enhance the user experience for taking photos or videos. In one embodiment, the user interface used for taking a photo or a video may be aligned according to the user's handedness or preference. The alignment of the user interface based on the user's handedness or preference may include, but is not limited to: the icons for the photography and/or videography application; or the vertically aligned buttons of "Use Photo", "Use For All Live Fetches", "Save", "Retake", and etc following the taking of a photo and/or multimedia content without text. For example, after a user with a right handed preferred layout takes a photo, the user interface may have the following alignment of the buttons from top to bottom shifted to the right center of the screen: a button to "Use Photo", a button to "Use For All Live Fhetches", with an unfilled circle; a "Save" button; and, at the very bottom, a "Retake" button.

In one example, the mobile application may be able to sense or detect the user's handedness and configure the user interface accordingly. In one embodiment, the user may be able to toggle between several modes of using a camera's flash feature. For example, the camera may automatically turn on a flash of light if the scene of a photo or video has insufficient illumination ("auto" mode), the camera may have the flash feature on during the taking of all photos or videos regardless of background illumination ("on" mode), the camera may have the flash feature off during the taking of all photos or videos regardless of background illumination ("off" mode), the camera may keep the flash on regardless of whether a photo or video is being taken so as to enable the user to use the light for personal use ("light" mode), or the camera may keep a different lighting, for instance, to avoid "red eyes" during photography. In one embodiment, the user of a mobile application for photography and/or videography may be able to toggle between the ability to use the user interface side of the mobile device facing the subject of the photograph or video ("selfie" mode) and the ability to have the user interface side of the mobile device face the photographer or videographer ("front view" mode).

In one embodiment, users of the presently disclosed mobile application for requesting or "fhetching" multimedia content may only follow someone if they have a username registered with the mobile application. Usernames can be set up online on a website or on the mobile application. In one embodiment, users may be able to follow other users by knowing the username, email, and/or phone number, and/or by going to a "Friends" tab within a search function of the application. In one embodiment, the users' names will appear as the user is typing the username, based on usernames that are stored in the Fhetch database of unique usernames that may be linked to a unique email address and/or unique phone number. In one embodiment, application ("fhetch") users that are also followers can still fhetch any friend or user independently; however, in some embodiments, the application can prevent users from "fhetching" followers that are not friends or being fhetched by followers that are not friends. Still further, in some embodiments, followers that are not friends can be prevented from replying to a photo or other multimedia content, while instead being limited to only viewing and "liking" said photo or other multimedia content.

In some implementations, the mobile operating system may allow the user to launch the client application associated with a particular notification directly from a notification window by selecting the notification as it is displayed via the operating system GUI on the mobile device. Further, once a client application is opened or executed, the specific targeted content that is sent to the user's mobile device at a particular time may also be based on the current geographic location of the mobile device. The delivery of such geo-located content to the user's device may be triggered when, for example, the location of the user's mobile device is determined to be within a designated geographic area, e.g., covered by a geo-fence associated with the targeted content.

Reference will now be made in detail to the exemplary embodiments of the disclosure, examples of which are illustrated in the accompanying drawings. Wherever possible, the same reference numbers will be used throughout the drawings to refer to the same or like parts.

FIG. 1 is a schematic diagram of a series of environments in which users may access Internet content, photographs, social networks, and advertising, according to exemplary embodiments of the present disclosure. Specifically, FIG. 1 depicts how users 100 may access the Internet using any number or type of Internet-enabled devices, such as, for example, a mobile device 102 (e.g., smartphone, PDA, etc.), a work computer 104 (e.g., such as a PC, Windows, Mac, etc., whether desktop or laptop), a home computer 106 (e.g., a PC or Mac laptop or desktop), an automobile computer 108 (e.g., whether OEM or after-market), a tablet 110, or any other type of kiosk, computer, or mobile device connected to the Internet through a wired or wireless connection. The mobile device consistent with the present disclosure may also or alternatively include any type of wearable mobile device, such as an Internet-enabled smart watch, a pair of smart glasses, a health bracelet, or the like.

Figure 2A:
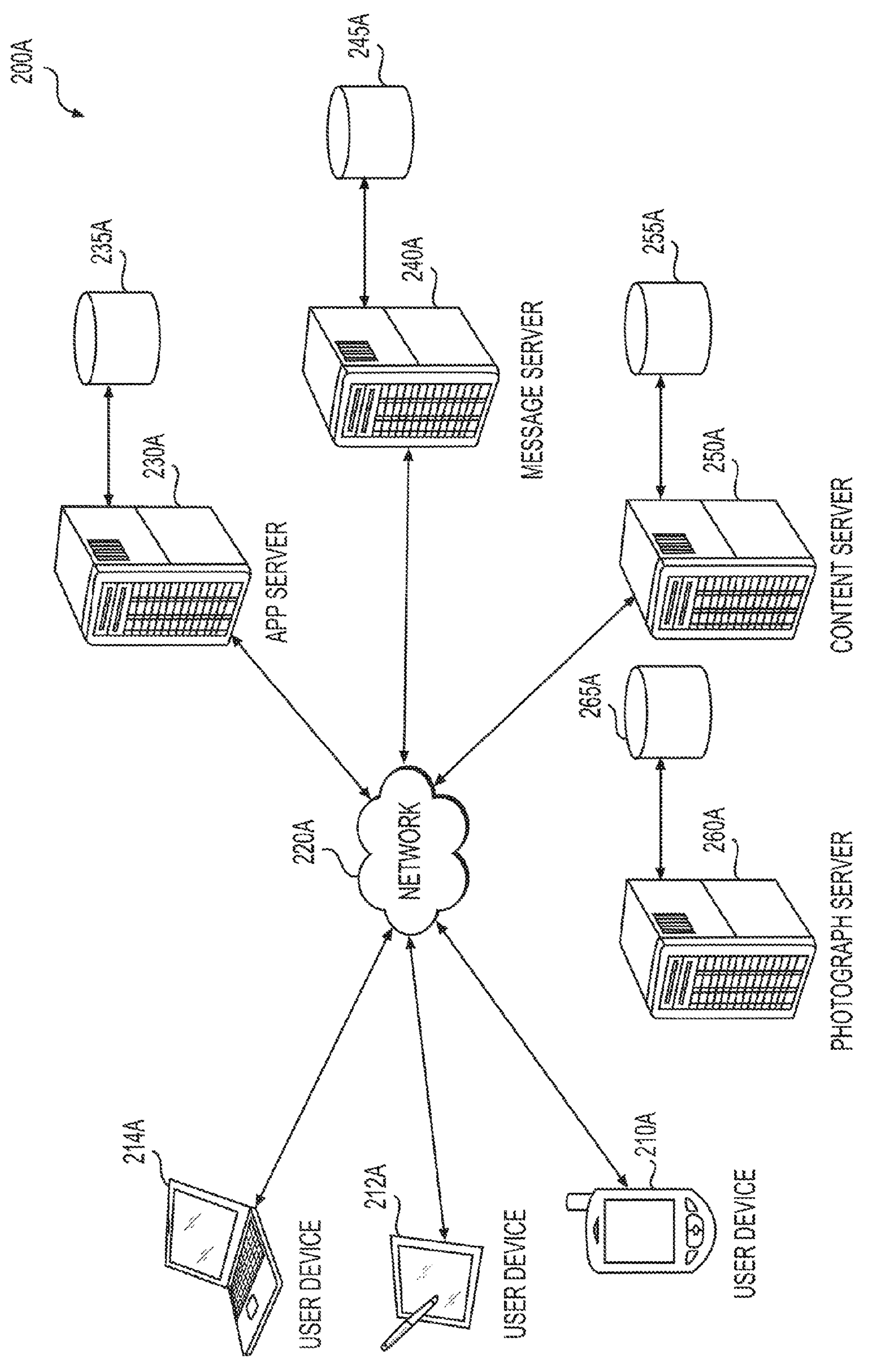
FIG. 2A is a block diagram of an exemplary communication system, network, and database and server systems suitable for practicing an embodiment of the present disclosure.

FIG. 2A is a block diagram of an exemplary communication system 200A for practicing embodiments of the present disclosure. As shown in FIG. 2A, system 200A includes user devices 210A, 212A, and 214A, an application server 230A coupled to a database 235A, a message server 240A coupled to a database 245A, a content server 250A coupled to a database 255A, and a photograph server 260A coupled to a database 265A, all of which may be communicatively coupled via an electronic communication network 220A.

Network 220A may be any type of electronic network or combination of networks used for communicating digital content and data between various computing devices. Network 220A may include, for example, a local area network, a medium area network, or a wide area network, such as the Internet. While only user devices 210A, 212A, and 214A are shown in FIG. 2A, system 200A may include any number of user devices. Similarly, while only application server 230A, message server 240A, content server 250A, and photograph server 260A are shown in FIG. 2A, it should be understood that system 200A may include additional or fewer servers, as desired for a particular implementation. Further, while not shown in FIG. 2A, network 220A may include various switches, routers, gateways, or other types of network devices used to facilitate communication between various computing devices via network 220A.

In the example shown in FIG. 2A, user device 210A may be a mobile handset, smartphone, or personal digital assistant ("PDA"). User device 212A may be, for example, a tablet device or similar type of mobile device having a touchscreen display. User device 214A may be, for example, a laptop, notebook, netbook, or similar type of mobile computing device. However, it should be noted that each of user devices 210A, 212A, and 214A may be any type of mobile computing device configured to send and receive different types of data including, but not limited to, website data, multimedia content, electronic advertisements, and any other type of digital information, over network 220A. Examples of such mobile computing devices include, but are not limited to, a laptop computer, a handheld computer, a personal digital assistant (PDA), a cellular telephone, a network appliance, a camera, a smart phone, an enhanced general packet radio service (EGPRS) mobile phone, a watch, a media player, a navigation device, a portable game console, or any combination of these computing devices or other types of mobile computing devices having at least one processor, a local memory, a display, one or more user input devices, and a network communication interface. The user input device(s) may include any type or combination of input/output devices, such as a display monitor, touchpad, touchscreen, microphone, camera, keyboard, and/or mouse.

Each of application server 230A, message server 240A, content server 250A, and photograph server 260A may be any of various types of servers including, but not limited to, a web server, a proxy server, a network server, or other type of server configured to exchange electronic information with other servers or computing devices via a communication network, e.g., network 220A. Such a server may be implemented using any general-purpose computer capable of serving data to other computing devices including, but not limited to, user devices 210A, 212A, and 214A or any other computing device (not shown) via network 220A. Such a server may include, for example and without limitation, a processor and memory for executing and storing processor-readable instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware can include, but is not limited to, a processor, memory and graphical user interface display. The server may also be implemented using multiple processors and multiple shared or separate memory devices within, for example, a clustered computing environment or server farm.

Also, as shown in FIG. 2A, application server 230A, message server 240A, content server 250A, and photograph server 260A are communicatively coupled to databases 235A, 245A, 255A, and 265A, respectively. Each of databases 235A, 245A, 255A, and 265A may be a data store or memory accessible to the corresponding server and may be implemented using any type of data storage device or recording medium used to store various kinds of data or content. Such data or content may include, for example and without limitation, text or media content that may be later provided to each of user devices 210A, 212A, and 214A via network 220A.

In an example, each of user devices 210A, 212A, and 214A may execute a client application that communicates with application server 230A, message server 240A, content server 250A, and photograph server 260A via network 220A. Further, each of user devices 210A, 212A and 214A may be configured to receive application content through an interface provided by application server 230A via network 220A. The content provided by application server 230A may be based on, for example, user requests initiated via a GUI of the client application executable at each device. The GUI of the client application executable on each of user devices 210A, 212A, and 214A may be configured to present the content to a user at each device via a display of the respective user devices 210A, 212A, and 214A. The GUI of the client application may include, for example, various control elements enabling the user to request various types of content, e.g., which may be associated with a web site maintained by the application service provide. Further, a portion of the GUI of the client application may serve as a content view area used to display content (e.g., electronic advertisements) from a third-party content provider associated with content server 250A. Such a content view of the client application may be a dedicated content area, e.g., displayed at the very top or bottom portion, of the application's GUI. As described above, such third-party content, e.g., as provided by content server 250A via network 220A, may be displayed within the content view of the client application when the client application is actively executing on user device 210A, 212A, or 214A. Also, as described above, such third-party content may be different from the messages sent by an application provider for display to the user via a general message notifications interface of the operating system on user device 210A, 212A, or 214A even when the client application is dormant or not actively executing at the particular device.

Application server 230A may be configured to host a web service that provides users various types of functionality via a GUI of the client application executable on each of user devices 210A, 212A, and 214A. Such functionality may include, for example and without limitation, providing digital content distributed by an application service provider associated with the client application. The application service provider may be, for example, an online content provider, including those associated with various search engines, e-mail programs, RSS feed providers, magazines, e-zines, blogs, or any other online site or program that publishes or distributes online content related to, for example, news or various topics of general public interest. As described above, a functionality provided by such an application service provider may include sending messages, e.g., push notifications, related to topics of interest, as specified by a user/subscriber of each user device. Also, as described above, the messages sent to each device may be displayed for the user via a message notifications interface of a mobile operating system on each of user devices 210A, 212A, and 214A if, for example, the client application has not been launched by the user or is not actively executing at the user's device.

Further, application server 230A and message server 240A may be configured to communicate with content server 250A or one or more other third-party content servers (not shown) to retrieve content (e.g., electronic advertisements) via network 220A to be displayed within a content view of a client application executable on each of user devices 210A, 212A, and 214A. Further, application server 230A, message server 240A, content server 250A, and photograph server 260A may each interact with one another, user devices 210A, 212A, or 214A, or any other servers or network devices (not shown) via network 220A. Examples of such other servers include, but are not limited to, DNS servers, ad servers, and content distribution servers.

Message server 240A in this example may be configured to control the timing of messages or push notifications to be sent via network 220A to each of user devices 210A, 212A, and 214A based on the status of a request or fhetch, the identities of the sender or recipient, the locations of the sender or recipient, the status (i.e., muted or privacy settings) of the sender or recipient, and so on, as described above.

In some implementations, message server 240A may be implemented as a back-end component that interfaces with only application server 230A, content server 250A, and photograph server 260A. Thus, it should be noted that for some implementations, message server 240A may be configured to act as an intermediary between application server 230A and content server 250A or application server 230A and photograph server 260A, without any direct communication with any of user devices 210A, 212A, or 214A, in order to facilitate the message notification timing functionality described herein. Accordingly, application server 230A, message server 240A, content server 250A, and photograph server 260A may be configured to exchange information in the form of messages, requests, or responses that are passed between the servers. The communication between application server 230A, message server 240A, content server 250A, and photograph server 260A may be over network 220A or a virtual private network accessible to each server. In an example, multimedia content, such as messages and photographs, may be routed from message server 240A and/or photograph server 260A to application server 230A, when it is determined that user device 210A, 212A, or 214A is directed to receive a particular photograph, request, or "fhetch." Application server 230A may then send the photograph, request, or "fhetch" to user device 210A, 212A, or 214A via network 220A. However, it should be noted that the functions performed by application server 230A, message server 240A, content server 250A, photograph server 260A, or any combination thereof, as described herein, may be implemented using a single server. Additional features and characteristics of the communication between user devices 210A, 212A, and 214A, application server 230A, message server 240A, content server 250A, and photograph server 260A will be described in further detail below with respect to FIGS. 3-23.

Figure 2B:
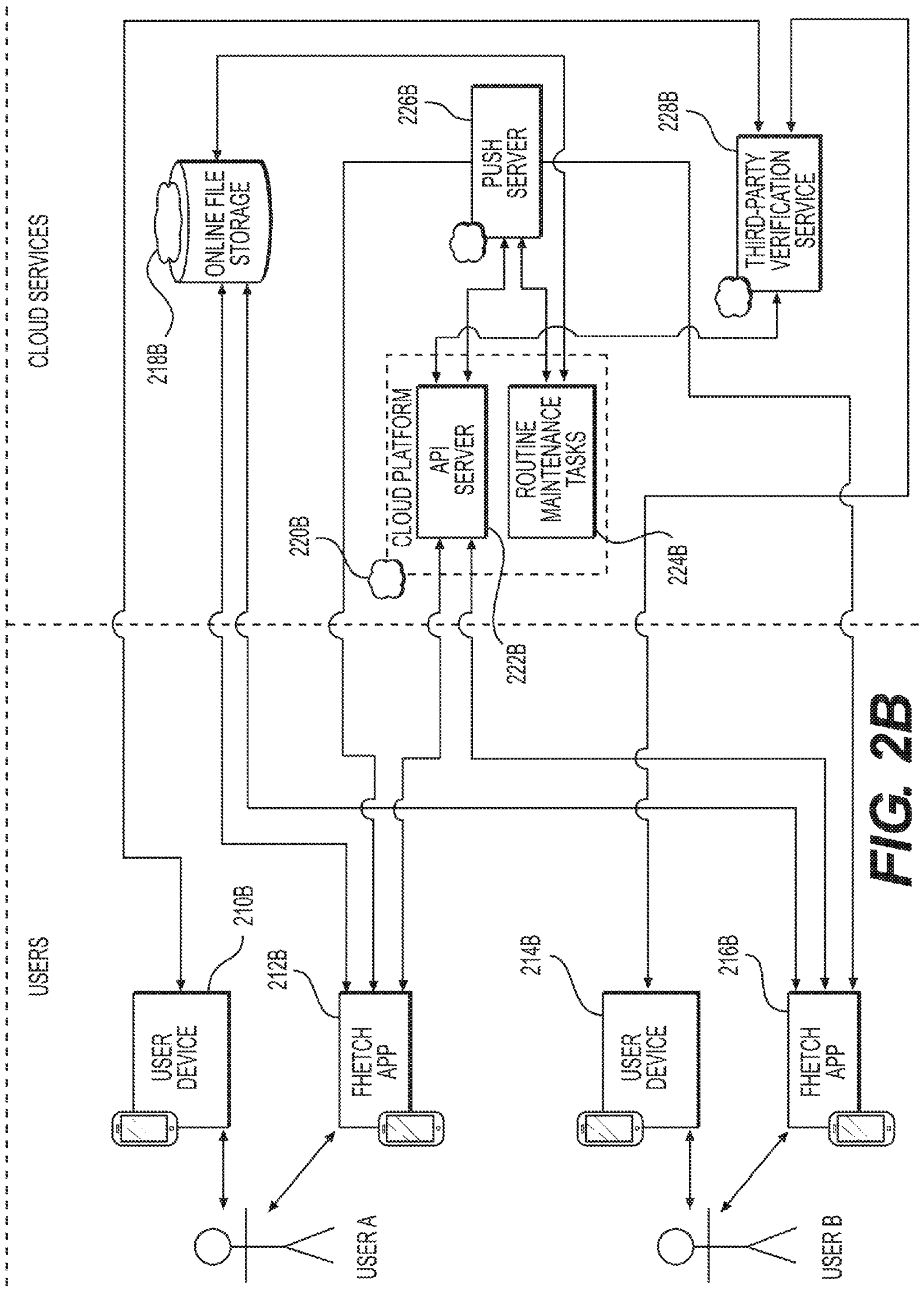
FIGS. 2B, 2C, and 2D outline the system architecture for the system and network for managing electronic requests for photographs and multimedia content, and enabling electronic social sharing, thereof.
Figure 2C:
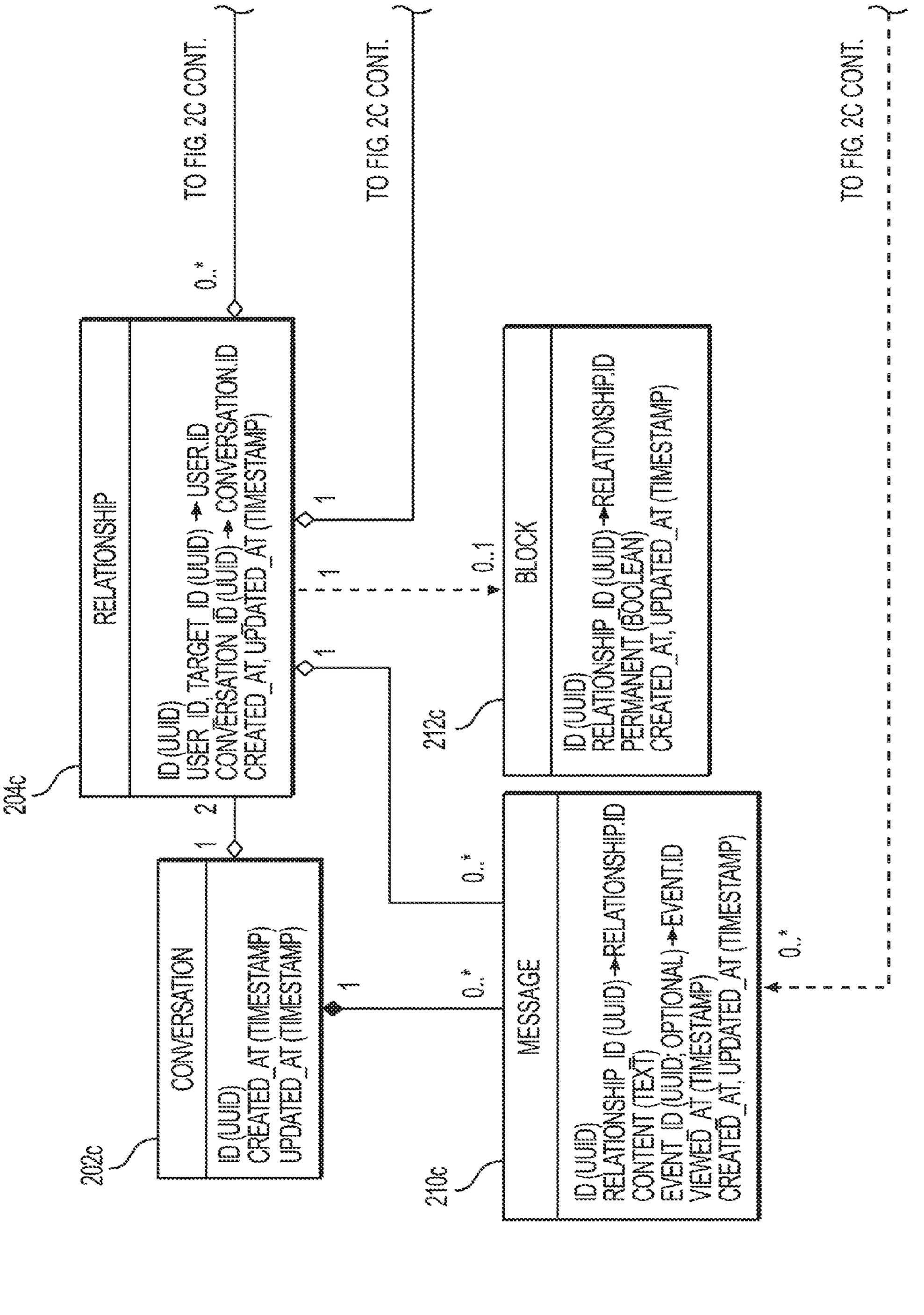
Figure 2C:
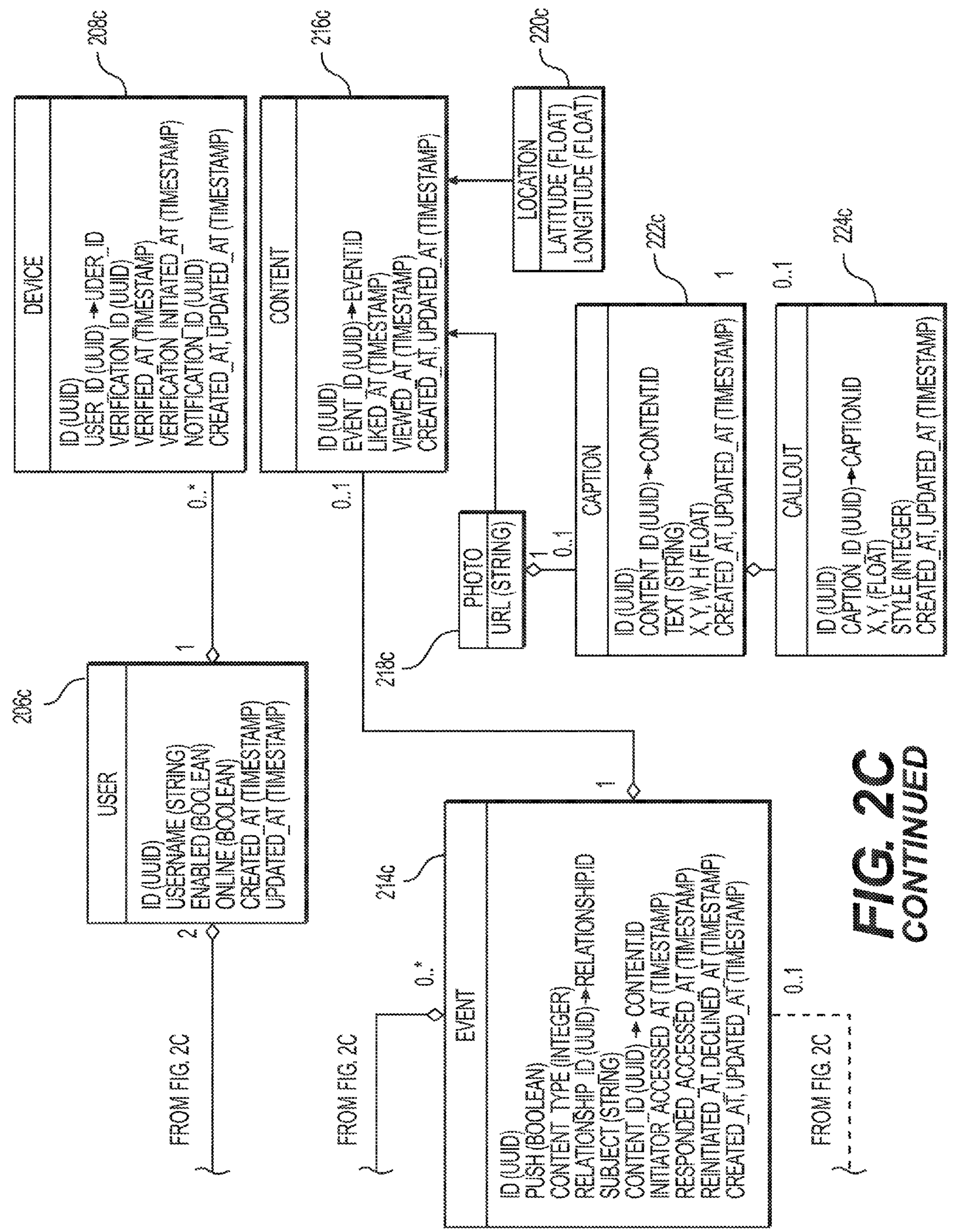
Figure 2D:
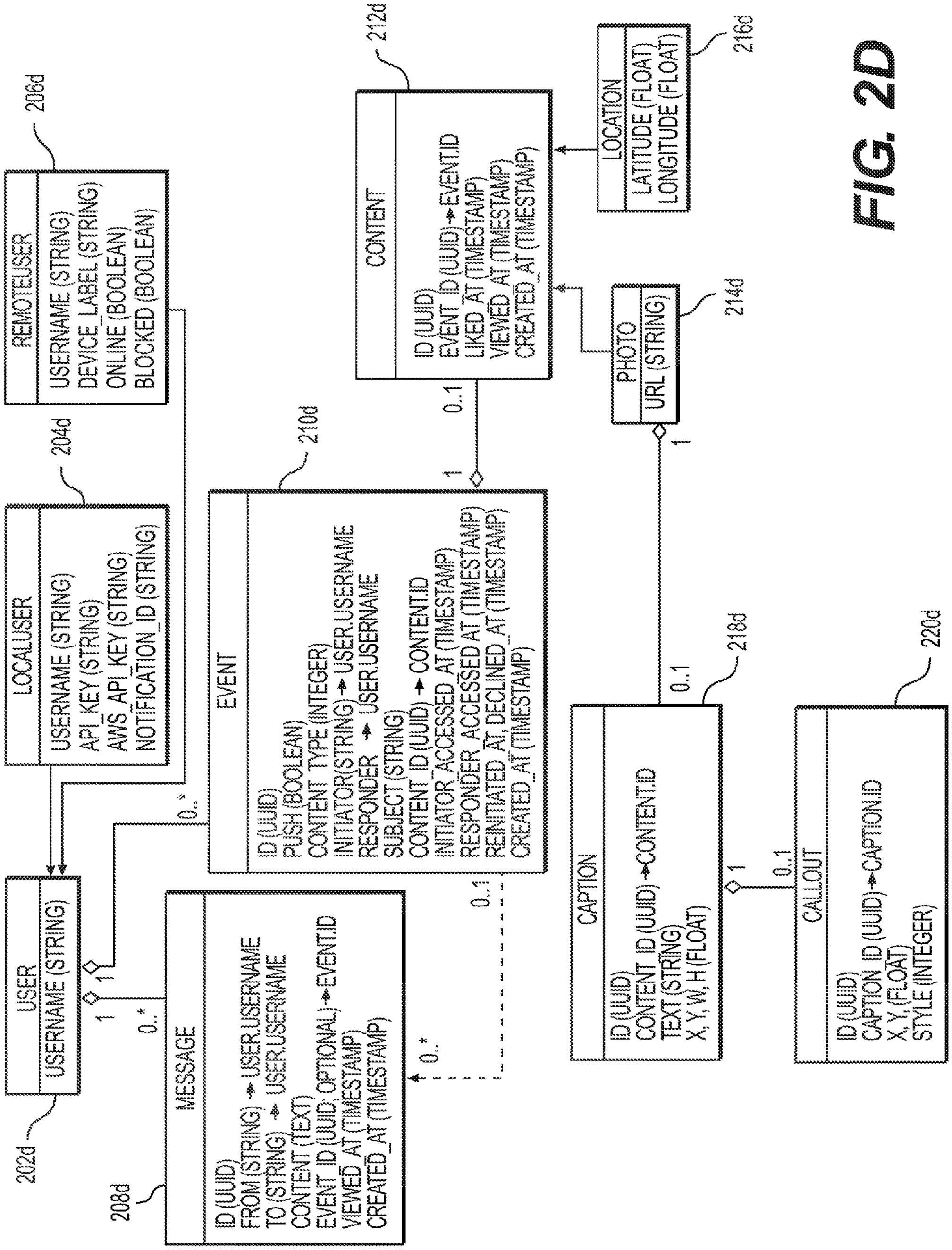
Figure 4:
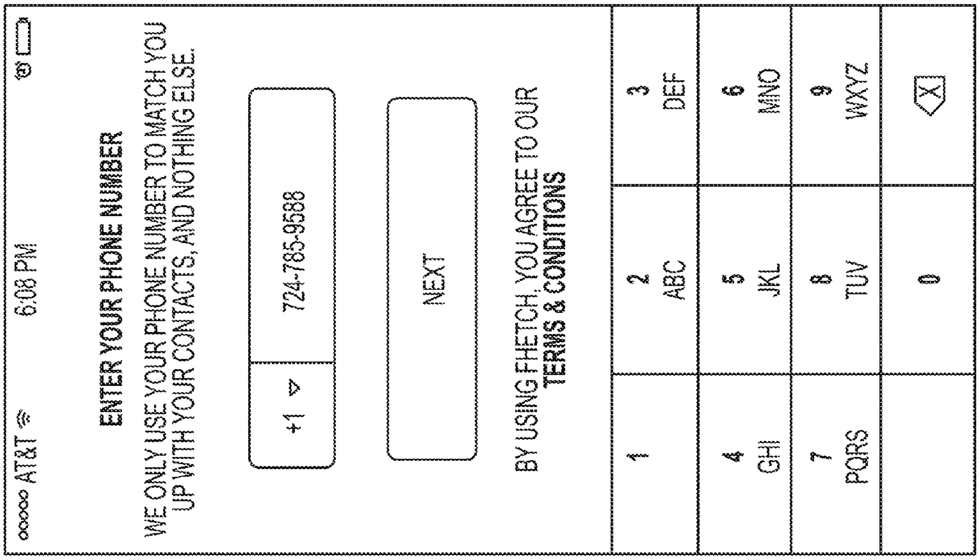
FIG. 3-24 are screenshots of exemplary user interfaces of a mobile application for sharing multimedia content, such as photographs, according to one or more embodiments of the present disclosure.
Figure 3:
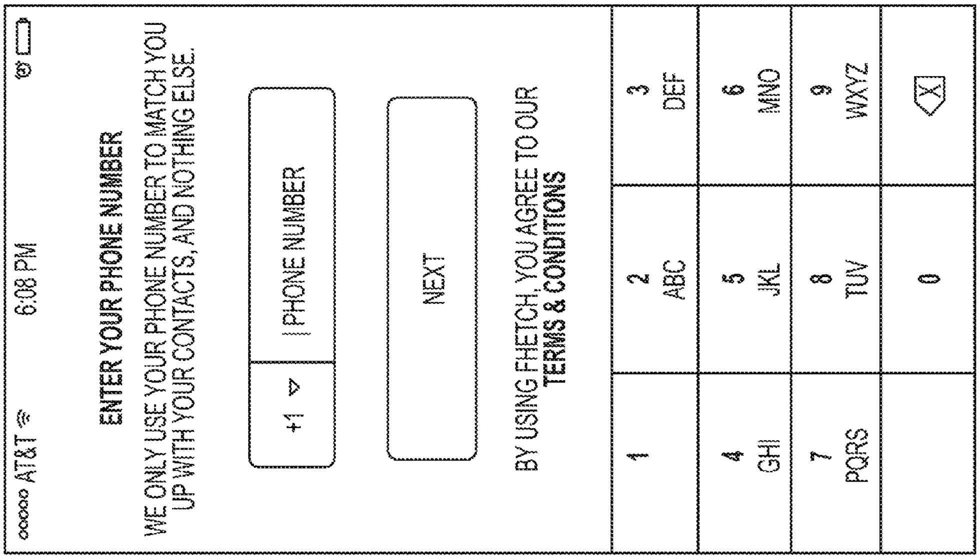
Figure 6:
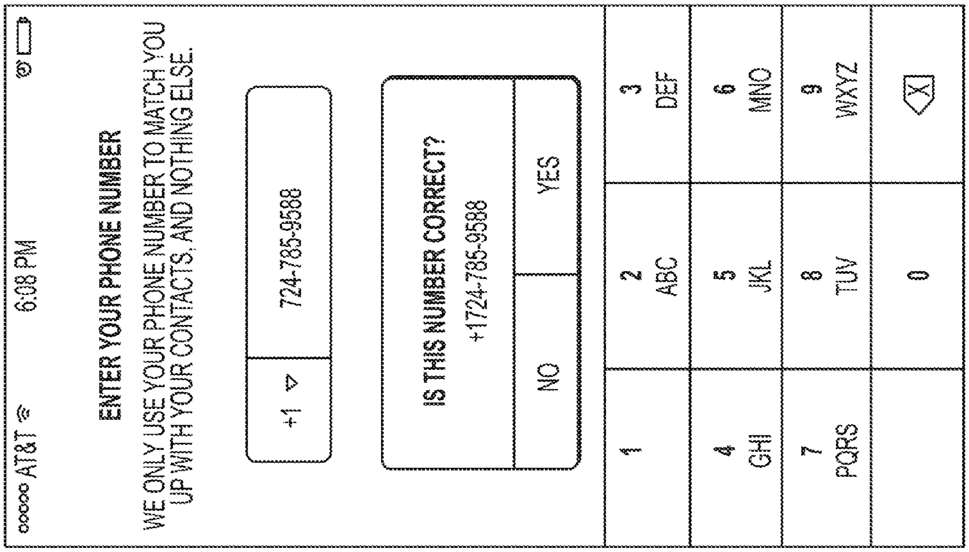
Figure 5:
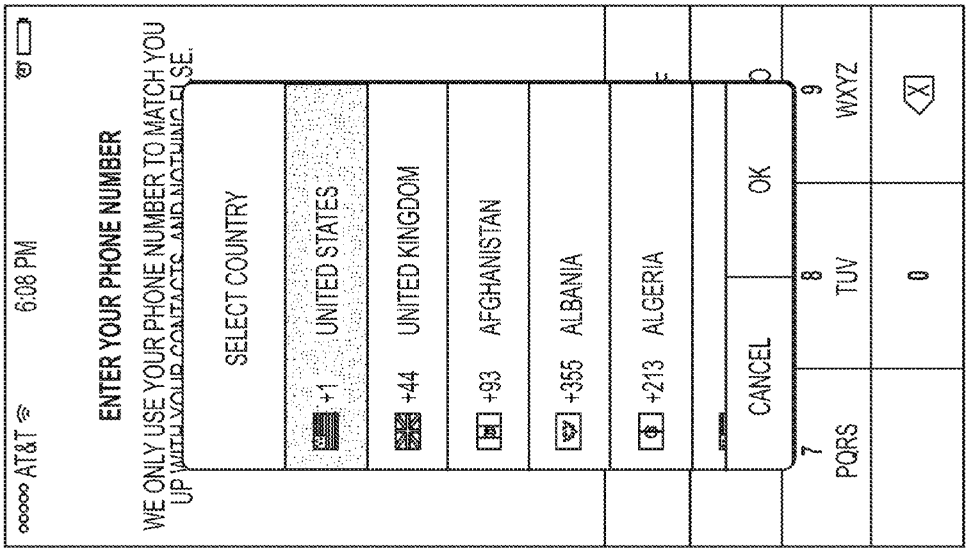
Figure 8:
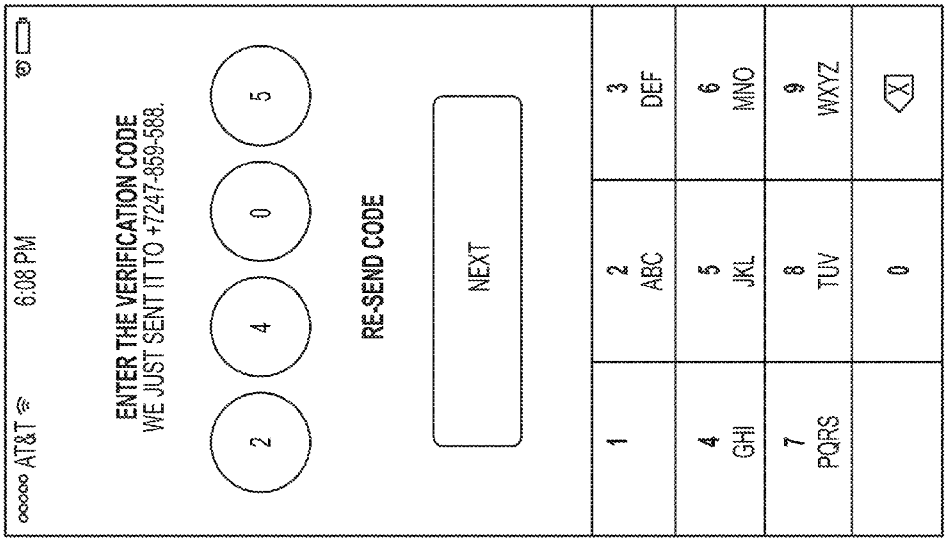
Figure 7:
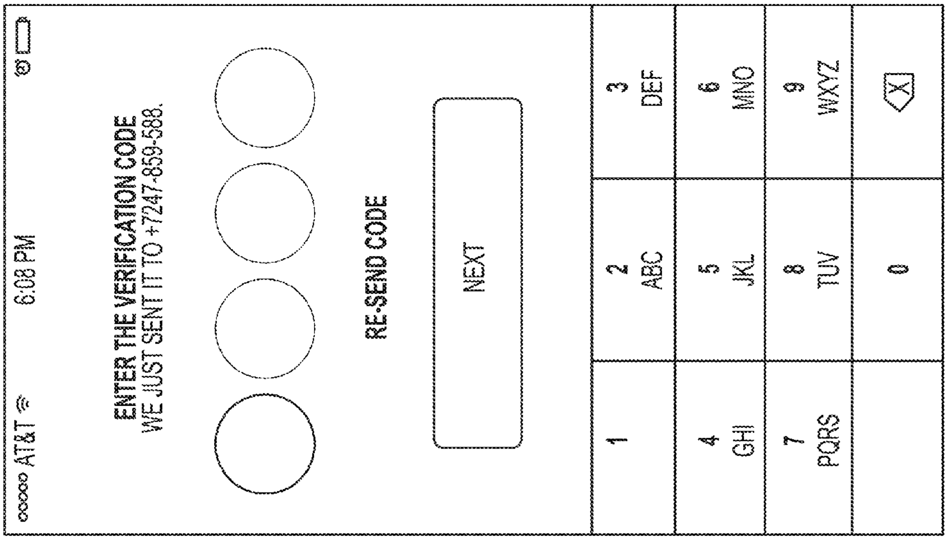
Figure 10:
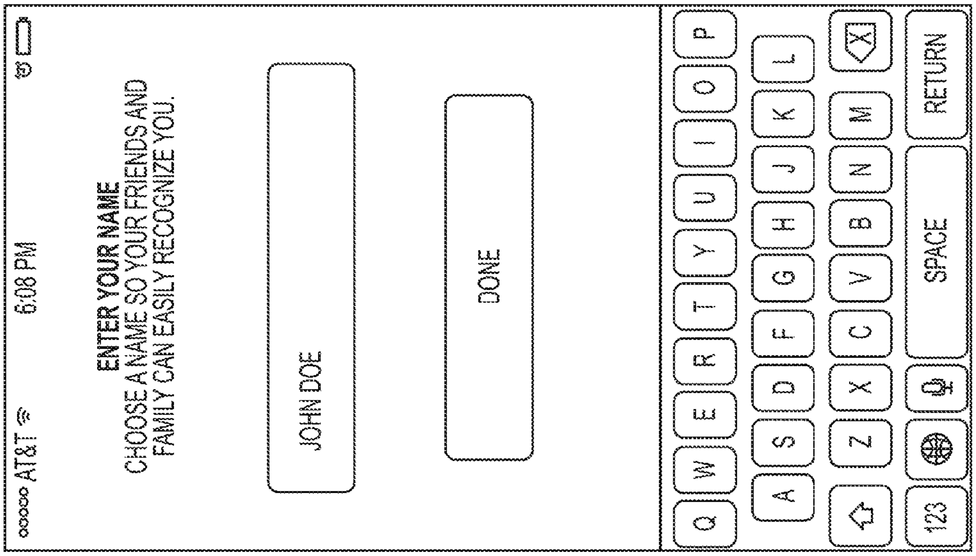
Figure 9:
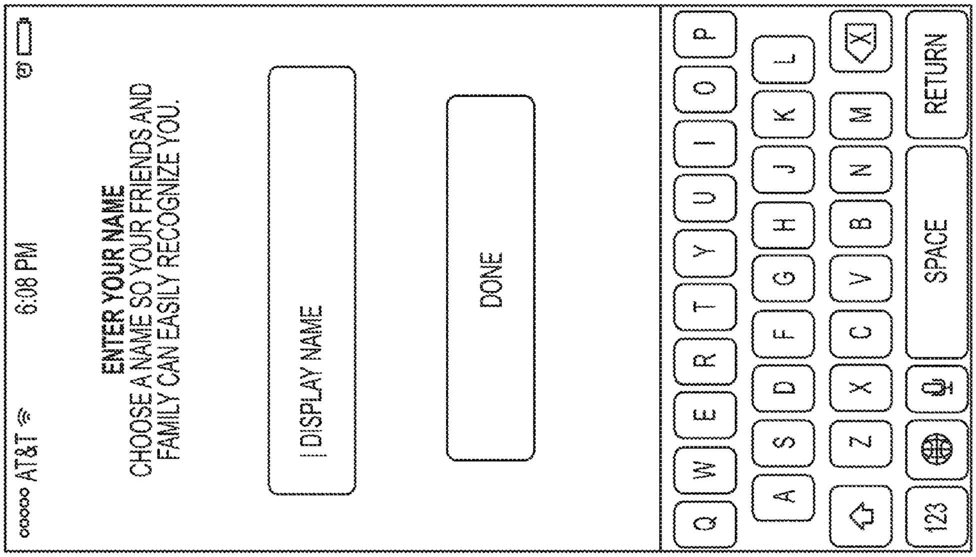

FIGS. 2B, 2C, and 2D outline the system architecture for the system and network for managing electronic requests for photographs and multimedia content, and enabling electronic social sharing, thereof ("Fhetch system"). The Fhetch system may support one or more operating systems, including, but not limited to, iOS, Android, Apple, OS X, Linux and its variants, and Microsoft Windows. Unlike prior photo-sharing applications, the systems, methods, and network of the present disclosure utilizes the operating system with a simplicity of operation in mind.

FIG. 2B includes a block diagram depicting the lines of communication between various system elements, where each rectangle may represent a separate piece of software, cloud platform, user device, and/or hardware. Rectangles 218, 220, 226, and 228 may be elements that are shared among various cloud-based applications. The domain of software users may be represented on the left side of the diagram, while cloud services may be represented on the right side of the diagram. The arrows may indicate the direction in which information flows through the system.

A user of the Fhetch system may begin by installing the software application for managing electronic requests for photographs and multimedia content, and enabling electronic social sharing, thereof ("Fhetch app"), 212 or 216, onto the user device of choice, 210 or 214, respectively. For example, one user of the Fhetch system, User A, may install Fhetch app 212 onto her user device, 210, while another user of the Fhetch system, User B, may install Fhetch app 216 onto his user device, 214. The user devices may include, but are not limited to, a mobile handset, smartphone, personal digital assistant ("PDA"), a tablet device, a laptop, notebook, or a netbook. After initially launching the Fhetch app, 210 or 214, the user may be prompted to enter a means to be contacted as part of a verification process. For example, if the user device is a cellular telephone, smart phone, or other similar mobile device, the user may be prompted to enter a phone number as part of the verification process. The phone number may be handed off to a third-party verification service 228. The third-party verification service 228 may initiate verification via the provided phone number, calling the user on the user device, 210 or 214, with an automated prompt if a land-line number was provided. Through the third-party verification service 228, the user may receive a verification code and may enter that code onto a verification screen of the Fhetch app, 212 or 216. The Fhetch app, 212 or 216, may pass the verification code back to the third-party verification service 228 through a backend API server, and may wait for a receipt before completing the user verification. Once verified, the server may issue two API access keys to the Fhetch app, 212 or 216. The first key may authenticate a user for future API access by uniquely identifying the user's telephone number and user device, 210 or 214, while the second key may be used to provide access to upload photos, and other content to Amazon Web Services (AWS) Simple Storage Service (S3). Users may register multiple user devices, 210 or 214, under the same telephone number. Each user may be assigned a unique username and/or a unique user ID. In one embodiment, the user ID may be kept secret between the user and the server, and the username may be kept protected and implicitly shared with those who know the user's telephone number.

Once a user has been verified, communications with the server may be secured by using the provided API key. In one embodiment, if a user deletes the Fhetch app, 212 or 216, from his or her user device, 210 or 214, the user may need to re-register before being able to use the Fhetch app and/or Fhetch system. In one embodiment, if a user is to re-register with the same telephone number as was used prior to the deletion of the Fhetch app, then previously stored data on the server may be accessible through the Fhetch app. If a different telephone number is used to verify the user, then a new username and account may be established, and the old content may remain associated with the old username.

Users may initiate or respond to events, and/or send and receive messages to and from other contacts. The Fhetch system may use push notifications via a push server 226 as a means of passing information between users in real time. For example, a Fhetch system that supports an iOS platform may utilize the Apple Push Service (APS) for the push server 226. In one embodiment, for example in Android devices, it may be trivial to add push notification support without the need for a third-party push service.

A cloud platform 220 may host an API server and manage routine maintenance tasks of the Fhetch system. In one embodiment, the API server 222 may be written in Rails. In one embodiment, Heroku may be used as the cloud platform 220. The number of threads and processes used to support the service may be automatically scaled on demand by the cloud platform 220 (e.g., Heroku). The cloud platform 220 may also maintain a database that may be hosted by an online file storage web service 218 through the cloud platform 220 (e.g., Heroku). In one embodiment, the API server 222 may allow for a server process to be killed at any time without disrupting the operation of the system (e.g., as in RESTful API servers). The cloud platform 218 may perform routine maintenance tasks 224, which may include, but are not limited to, managing unused accounts, deleting expired photos, automatic detection of abuse of terms of service, and custom analytics.

As part of event initiation or response, users may directly upload photos to a storage bucket hosted by an online file storage web service 218, e.g., the Amazon Web Services Simple Storage Service ("AWS S3"). The server may be notified of the URL for all media uploaded to the online file storage web storage 218 (e.g., AWS S3) and may pass the URL to all intended recipients of the event. Direct uploads from the client Fhetch app, 212 or 216, may offer lower CPU and bandwidth demand on the API server hosted by a cloud platform (e.g., Heroku).

FIGS. 2C and 2D depict the architecture for two exemplary database designs. One design, as depicted in FIG. 2C, applies to the server, while the other design, as depicted in FIG. 2D, applies to the client. These two designs may be different because the server may treat all pairs of communicating users as equivalent and symmetric, while the client application may favor one specific user and proxy requests on behalf of that user. FIG. 2C depicts the relationships among tables hosted on the server-side database, while FIG. 2D depicts the relationships among tables hosted on the client-side database. The client-side database may be inherently simpler than the server-side database.

FIG. 2C depicts the architecture of an exemplary server-side database design. The server-side database may have tables for users, devices, relationships, conversations, messages, blocks, events, and content. The content may include locations and photos with photos having optional captions with optional callouts.

In one embodiment, the server-side database design may include the tables for: 'conversation' 202, 'relationship' 204, 'user' 206, 'device' 208, 'message' 210, 'block' 212, 'event' 214, 'content' 216, 'photo' 218, 'location' 220, 'caption' 222, and 'callout' 224.

The following detailed descriptions may hold for elements in the abovementioned tables. Each object of the table may be designated using single quotes (e.g., as in 'user', 'photo', etc.) and referred to in its singular (e.g., ('user') and/or its plural usage ('users')

In one embodiment, 'user' may be the root object of the Fhetch system and application. A 'user' may have many 'relationships' and/or belong to many 'relationships'. A 'user' may be referred to as the target of any 'relationship' that the 'user' belongs to. A 'user' may also have many 'devices'. In one embodiment, the account of the 'user' may not be enabled until they have verified at least one 'device'. Through 'relationships', 'users' may have 'events', 'conversations', 'messages', and 'blocks'. Through 'events', 'users' may have 'contents' such as 'photos' and 'locations'. Through 'photos', users may have 'captions', which may optionally have 'callouts'. In one embodiment, the following database table may describe the elements of 'users':

| Relationship | Multiplicity | Related Object |
|---|---|---|
| Owns | Zero or more | Device |
| DOwns | Zero or more | Relationship |

| Field Name | Multiplicity | Description |
|---|---|---|
| id | uuid | A UUID for the user. |
| username | string | A hash of the user's registered phone number |
| enabled | boolean | Indicates whether or not the user's account is enabled. |
| banned | boolean | Indicates whether or not the user's account has been permanently banned. |
| online | boolean | Indicates whether or not the user is running the app on one or more devices. |
| created_at | timestamp | The date and time that the user was created. |
| updated_at | timestamp | The date and time that the user's app last checked in with the server. The check in API action results in updating this row and sets online to true. |

In one embodiment, 'relationships' may belong to exactly one user and target another user. The 'relationship' object may be the cornerstone for all data shared between users. In one embodiment, 'relationships' may be blocked. Furthermore, 'relationships' may have complements, wherein the user and target roles may be reversed. A 'relationship' may also be paired with a 'conversation', and each 'conversation' may have two complementary 'relationships'. A 'message' may belong to a 'conversation' through a 'relationship' where the receiver of the 'message' is the target of the 'relationship'. In one embodiment, the following database tables may describe the relationships ("Relationships"), multiplicities, ("Multiplicity"), related objects ("Related Object"), field names ("Field Names"), field types ("Field Type"), and description of the field names ("Description") for 'relationship':

| Relationship | Multiplicity | Related Object |
|---|---|---|
| Belongs to | Exactly One | User |
| Has | Exactly One | Conversation |

| Field Name | Field Type | Description |
|---|---|---|
| id | uuid | A UUID for the contact relationship |
| user_id | uuid | A hash of the user's registered phone number |
| target_id | uuid | Indicates whether or not the user's account is enabled. |
| conversation_id | uuid | The id of the conversation that this relationship is associated with. |
| created_at | timestamp | The date and time that the entry was created. |
| updated_at | timestamp | The date and time that the entry was last modified. |

In one embodiment, each 'device' may belong to a 'user'. 'Devices' may have multiple unique identifiers. The notification_id may be assigned by the client application running on the device, and is specific to the device manufacturer's notification service API. The verification_id may belong to a third party verifier of the device (e.g., Nexmo). The ID of a 'device' may be the internal ID maintained by a server and may be used to authenticate use of the server API. In one embodiment, the following database tables may describe relationships ("Relationships"), multiplicities, ("Multiplicity"), related objects ("Related Object"), field names ("Field Names"), field types ("Field Type"), and description of the field names ("Description") for 'device':

| Relationship | Multiplicity | Related Object |
|---|---|---|
| Belong to | Exactly One | User |

| Field Name | Field Type | Description |
|---|---|---|
| id | uuid | A UUID for the device (this is not the same as the UDID assigned by the manufacturer). This id will be transmitted back to the device and will be used as an access token by the device. |
| user_id | uuid | The id of the user. |
| verification_id | string | A unique code generated by the third party verifier (e.g., Nexmo) for referencing the verification object. |
| verification_initiated_at | timestamp | Indicates the date/time verification was initiated for this device. |
| verified_at | timestamp | The date/time when the device was verified via an SMS confirmation code. |
| notification_id | string | An ID used by 3rd-party push notification servers to uniquely identify the device. |
| created_at | timestamp | The date and time that the entry was created. |
| updated_at | timestamp | The date and time that the entry was last modified. |

In one embodiment, each 'event' may belong to a 'relationship' and may optionally be assigned with a 'content' and one or more 'messages'. In one embodiment, an 'event' may have exactly one initiator and one responder, wherein the initiator may be the 'user' of the 'relationship' and the responder may be the target of the 'relationship'. There may be two types of 'events': push and pull. Push 'events' may occur when the initiator of the 'event' includes 'content' with the 'event' upon creation. Pull 'events' may occur when the initiator creates an 'event' without 'content'. In one embodiment, pull 'events' may be reinitiated, but push 'events' may not be reinitiated. 'Events' may optionally have a subject label that may be created by the initiator. In one embodiment, neither the subject nor the 'content' of the 'event' may be modified once they are created. The following database tables may describe relationships ("Relationships"), multiplicities, ("Multiplicity"), related objects ("Related Object"), field names ("Field Names"), field types ("Field Type"), and description of the field names ("Description") for 'events':

| Relationship | Multiplicity | Related Object |
|---|---|---|
| Belongs to | Exactly One | Relationship |
| Has | Zero or One | Content |

| Field Name | Field Type | Description |
|---|---|---|
| id | uuid | A UUID for the application event. |
| push | boolean | Specifies whether or not the event was initiated to push information to another user. (Set to false if the initiator of the event is requesting to pull information from another user.) |
| content_type | integer | An enumerated type describing what type of content should/is/will be attached to this event. {Content::Type::None = 0, Content::Type::Photo = 1, Content::Type::Location = 2} Content::Type::None is not allowed. |
| relationship_id | uuid | The id of the relationship between the two users participating in the event. |
| subject | string | A string optionally used by the initiator to describe the event. This subject will be displayed to the responder before the responder chooses to view or create content. |
| content_id | uuid | The id of the content associated with this event |
| initiator_accessed_at | timestamp | The last date which the initiator opened the event for viewing |
| responder_accessed_at | timestamp | The last date which the responder opened the event for viewing |
| reinitiated_at | timestamp | The date and time that the initiator last attempted to send the event to the responder. |
| declined_at | timestamp | The date and time that the entry was declined by the responder. |

-continued

| Field Name | Field Type | Description |
|---|---|---|
| created_at | timestamp | The date and time that the entry was created. |
| updated_at | timestamp | The date and time that the entry was last modified. |

In one embodiment, each 'content' object may belong to an 'event'. 'Content' types may include, but are not limited to, a 'location' and a 'photo'. A 'content' may be liked. In one embodiment, once a 'content' is liked, it may not be 'unliked'. The date and time of the 'like' may be recorded with the 'content' for a permanent or varied duration of time. The date and time when a 'content' is first viewed may also be recorded. In one embodiment, the following database tables may describe relationships ("Relationships"), multiplicities, ("Multiplicity"), related objects ("Related Object"), field names ("Field Names"), field types ("Field Type"), and description of the field names ("Description") for 'contents':

| Relationship | Multiplicity | Related Object |
|---|---|---|
| Belongs to | Exactly One | Event |
| Abstraction of | | Location |
| Abstraction of | | Photo |

| Field Name | Field Type | Description |
|---|---|---|
| id | uuid | A UUID for the content. |
| event_id | boolean | Specifies whether or not the event was initiated to push information to another user. (Set to false if the initiator of the event is requesting to pull information from another user.) |
| liked_at | timestamp | The date and time that the content was liked by its recipient. For push events, the recipient is the responder. For pull events, the recipient is the initiator. |
| viewed_at | timestamp | The date and time that the content was first viewed by the recipient If it is a push event, the recipient is the responder. If it is not a push event, then the recipient is the initiator. |
| created_at | timestamp | The date and time that the entry was created. |
| updated_at | timestamp | The date and time that the entry was last modified. |

In one embodiment, a 'photo' may be a type of 'content', so the 'photo' may inherit the attributes of a 'content' object. A 'photo' may include a URL that references the location of the image file containing a photo. 'Photos' may optionally include 'captions'. In one embodiment, the following database tables may describe relationships ("Relationships"), multiplicities, ("Multiplicity"), related objects ("Related Object"), field names ("Field Names"), field types ("Field Type"), and description of the field names ("Description") for 'photo':

| Relationship | Multiplicity | Related Object |
|---|---|---|
| Belongs to | Exactly One | Event |
| Kind of | | Content |

| Field Name | Field Type | Description |
|---|---|---|
| url | string | The URL to the photo on AWS S3. |

In one embodiment, a 'caption' may belong to a 'photo' and may optionally have one 'callout'. A 'caption' may have text that gets displayed in the body of a 'caption'. The position and size of the 'caption' are relative to the height and width of the 'photo' so that the relative size and position will be consistent across different 'devices'. In one embodiment, the following database tables may describe relationships ("Relationships"), multiplicities, ("Multiplicity"), related objects ("Related Object"), field names ("Field Names"), field types ("Field Type"), and description of the field names ("Description") for 'caption':

| Relationship | Multiplicity | Related Object |
|---|---|---|
| Belongs to | Exactly One | Event |
| Kind of | | Content |

| Field Name | Field Type | Description |
|---|---|---|
| id | uuid | A UUID for the caption. |
| content_id | uuid | References the photo that owns this caption. |
| text | string | The text to be displayed within the body of the caption. |
| x | float | The x position of the center of the body of the caption, expressed as a fraction of the halfwidth of the photo, relative to the horizontal center. |
| y | float | The y position of the center of the body of the caption, expressed as a fraction of the halfheight of the photo, relative to the vertical center. |
| w | float | The width of the body of the caption, expressed as a fraction of the half-width of the photo. |
| h | float | The height of the body of the caption, expressed as a fraction of the half-height of the photo. |
| created_at | timestamp | The date and time that the entry was created. |
| updated_at | timestamp | The date and time that the entry was last modified. |

In one embodiment, a 'callout' may belong to a 'caption'. 'Callouts' have a style and a position. The styles may include, but are not limited to, a speech and a thought. Thought-styled 'callouts' may be drawn with bubbles, while speech-styled 'callouts' may be drawn with lines. The position of a 'callout' may be expressed in the same coordinate system as the 'caption' in which the 'callout' belongs to. In one embodiment, the following database tables may describe relationships ("Relationships"), multiplicities, ("Multiplicity"), related objects ("Related Object"), field names ("Field Names"), field types ("Field Type"), and description of the field names ("Description") for 'callout'.

| Relationship | Multiplicity | Related Object |
|---|---|---|
| Belongs to | Exactly One | Caption |

| Field Name | Field Type | Description |
|---|---|---|
| id | uuid | A UUID for the caption. |
| caption_id | uuid | References the caption that owns this callout. |
| x | float | The x position of the tip of the callout, expressed as a fraction of the half-width of the photo, relative to the horizontal center. |
| y | float | The y position of the tip of the callout, expressed as a fraction of the half-height of the photo, relative to the vertical center. |
| style | integer | Determines the appearance of the callout. {Callout::Style::Speech = 0, Callout::Style::Thought = 1} |
| created_at | timestamp | The date and time that the entry was created. |
| updated_at | timestamp | The date and time that the entry was last modified. |

In one embodiment, a 'location' may be a kind of 'content', so it may inherit attributes of the 'content' object. Location objects may add attributes for latitude and longitude. In one embodiment, the following database tables may describe relationships ("Relationships"), multiplicities, ("Multiplicity"), related objects ("Related Object"), field names ("Field Names"), field types ("Field Type"), and description of the field names ("Description") for 'location':

| Relationship | Multiplicity | Related Object |
|---|---|---|
| Belongs to | Exactly One | Event |
| Kind of | | Content |

| Field Name | Field Type | Descriptions |
|---|---|---|
| latitude | float | The latitude of the location in decimal degrees. |
| longitude | float | The longitude of the location in decimal degrees. |

In one embodiment, 'conversations' may have two complementary 'relationships'. 'Conversations' may therefore be a bidirectional construct for communication. A 'conversation' may have many 'messages' through the two complementary 'relationships'. In one embodiment, the following database tables may describe relationships ("Relationships"), multiplicities, ("Multiplicity"), related objects ("Related Object"), field names ("Field Names"), field types ("Field Type"), and description of the field names ("Description") for 'conversation':

| Relationship | Multiplicity | Related Object |
|---|---|---|
| Has | Two | Relationships |
| Has | Many | Messages (through relationships) |

| Field Name | Field Type | Description |
|---|---|---|
| id | uuid | A UUID for the caption. |
| created_at | timestamp | The date and time that the entry was created. |
| updated_at | timestamp | The date and time that the entry was last modified. |

In one embodiment, 'messages' may belong to a 'user' through a 'relationship'. The 'messages' may target another 'user' through that same 'relationship'. Optionally, 'messages' may be a part of an 'event'. 'Messages' may each belong to a 'conversation' through its 'relationship', as well. In one embodiment, the following database tables may describe relationships ("Relationships"), multiplicities, ("Multiplicity"), related objects ("Related Object"), field names ("Field Names"), field types ("Field Type"), and description of the field names ("Description") for 'messages':

| Relationship | Multiplicity | Related Object |
|---|---|---|
| Belongs to | Exactly One | Relationship |
| Belongs to | Exactly One | Conversation (through a relationship) |
| Has | Zero or One | Event |

| Field Name | Field Type | Description |
|---|---|---|
| id | uuid | A UUID for the message. |
| relationship_id | uuid | The id of the relationship that specifies the sender and receiver of the message |
| content | text | The content of the message. |
| event_id | uuid | The UUID for the event about which the message was written. |
| viewed_at | timestamp | The date and time that the message was viewed by the receiver. |
| created_at | timestamp | The date and time that the entry was created. |
| updated_at | timestamp | The date and time that the entry was last modified. |

In one embodiment, each 'block' may belong to a 'relationship'. For example, a 'block' may be inherently unidirectional. 'Blocks' may be marked as permanent. 'Blocks' may serve to block all communications flowing back from the target of a 'relationship' to the 'user' of the 'relationship'. In other words, when a 'relationship' is blocked, it may be the complement of the 'relationship' that ceases to flow information while the blocked 'relationship' is hidden from its user. Blocking may serve to ignore the target of a 'relationship' on behalf of its 'user', by hiding any communications from the target of the 'block' and by making the user appear offline to the target of the 'block'. In one embodiment, the following database tables may describe relationships ("Relationships"), multiplicities, ("Multiplicity"), related objects ("Related Object"), field names ("Field Names"), field types ("Field Type"), and description of the field names ("Description") for 'blocks':

| Relationship | Multiplicity | Related Object |
|---|---|---|
| Belongs to | Exactly One | Relationship |

| Field Name | Field Type | Description |
|---|---|---|
| id | uuid | A UUID for the block. |
| relationship_id | uuid | The id of the relationship being blocked. |
| permanent | bool | Specifies whether the app on the owning user's device should hide the blocked user's name from their contacts, making the block effectively irreversible. |
| created_at | timestamp | The date and time that the entry was created. |
| updated_at | timestamp | The date and time that the entry was last modified. |

FIG. 2D depicts the architecture of an exemplary client-side database design. The client-side database may be a simplified version of the server-side database. In one embodiment, the client-side database design may include tables for 'User' 202D, localUser 204D, 'RemoteUser' 206D, 'Message' 208D, 'Event' 210D, 'Content' 212D, 'Photo' 214D, 'Location' 216D, 'Caption' 218D, and 'Call-out' 220D. In one embodiment, there may only be one localUser 204D per user device. As such, there may not be a need to explicitly define relationships with other 'users' 202D. Instead, a 'RemoteUser' table 206D may be introduced that contains all contacts that have been imported from a user device assigned to localUser 204D. Upon import, telephone numbers may be converted to usernames by using a SHA2 hexadecimal digest algorithm. This unidirectional transform may provide a secure means of identifying other users without exchanging telephone numbers with the server after initial verification has been performed. In one embodiment, the server-side database may be prohibited from storing a user's telephone number and/or name. In one embodiment, the function of mapping between names and usernames may be restricted to the client-side database, which is secured in the possession of the user device.

FIGS. 3 through 8 depict screenshots of exemplary user interfaces for setting up a mobile application on a user's mobile device, consistent with embodiments of the present disclosure. Specifically, the sequence of FIGS. 3 through 8 enable a user to verify their device and phone number by entering their mobile device phone number, entering their country, receiving a transmitted verification code, e.g., by text message, and entering the received verification code to verify that they are in possession of the mobile device associated with the input mobile number. It should be appreciated that the users may access each other and other contacts by users' email addresses, phone numbers, social networking usernames, unique IDs, or any other identifiers. In one embodiment, users may be prompted to sign-up with a username, password, and/or email. The application may further include age verification and/or verification that a human and not a robot/computer is registering for the application. In yet another embodiment, users may receive notifications when a friend, mobile device contact, or social networking contact has installed the mobile application consistent with the present disclosure.

Figure 12:
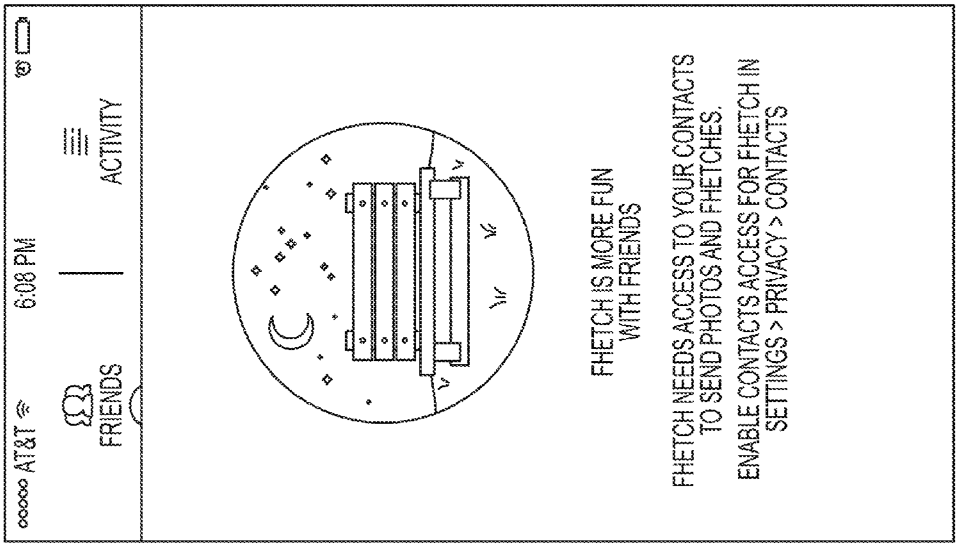
Figure 11:
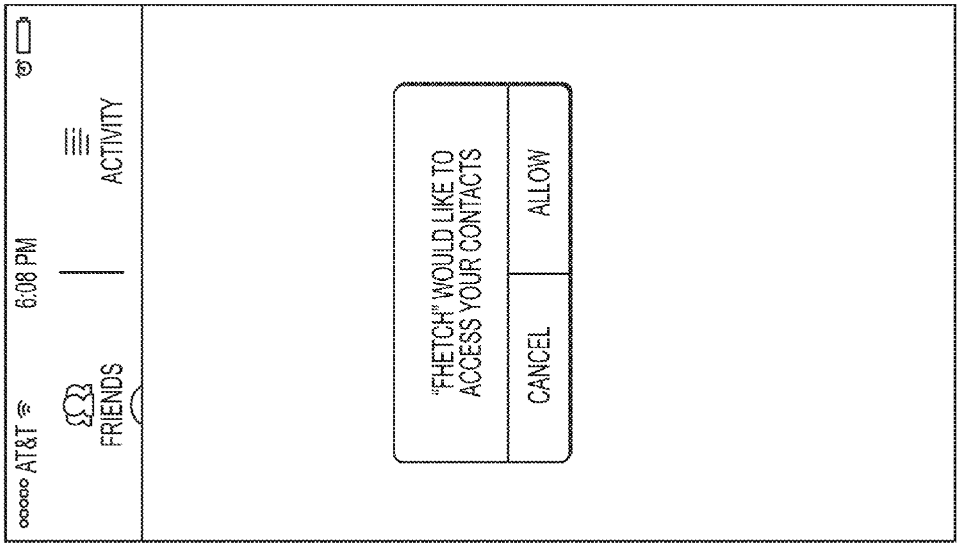

FIGS. 11 and 12 depict screenshots of exemplary user interfaces for prompting a user to enable the mobile application to obtain access to the user's mobile device contacts.

Figure 13B:
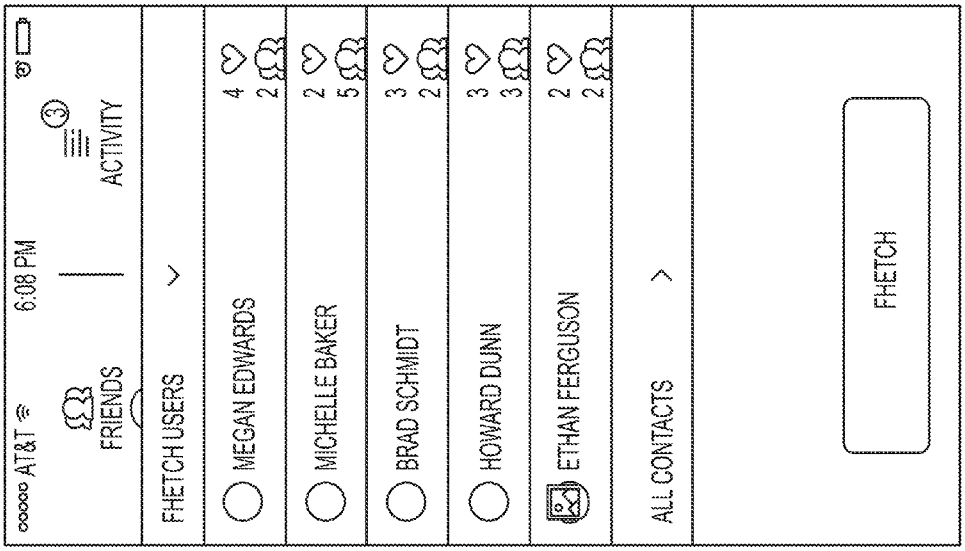
Figure 13A:
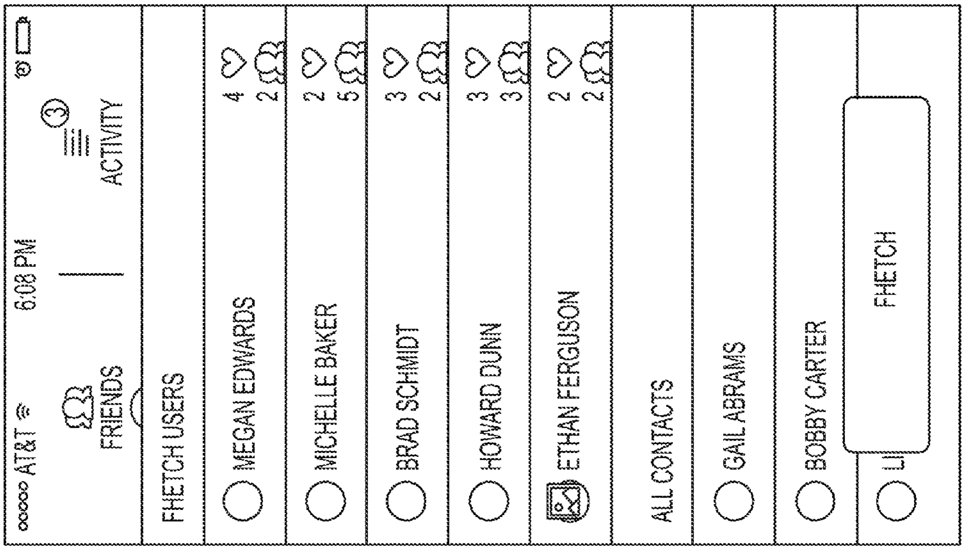
Figure 13C:
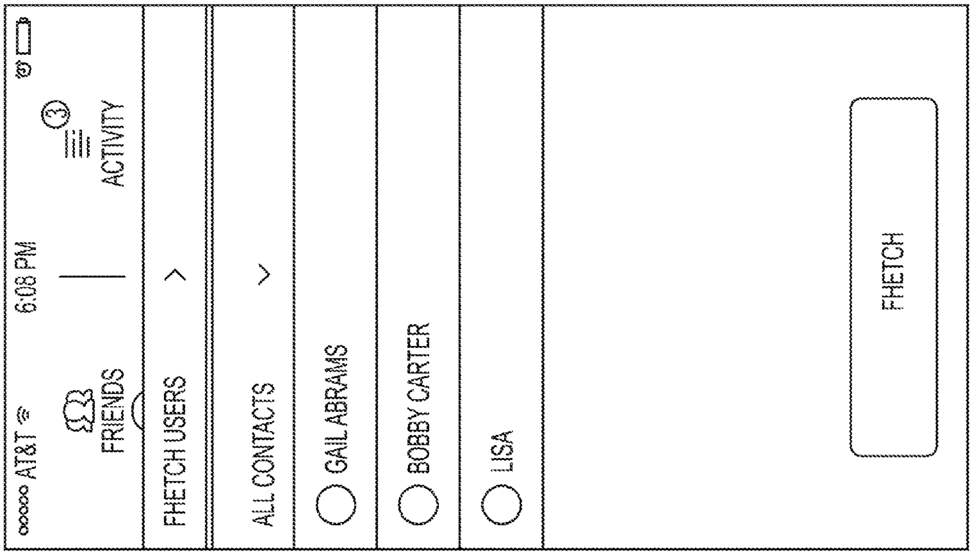

FIG. 13A depicts a screenshot of an exemplary user interface by which a first user, i.e., a sender, may select one or more "fhetch users" (i.e., contacts having the same mobile application installed) or "all contacts" to whom to send a request or fhetch. In one embodiment, tapping and holding directly on a name displayed in the "Friends" tab may enable the user to edit the displayed name of the user's friend. In one embodiment, the display of FIG. 13A may be configured such that the number of available other users, friends, and/or contacts is displayed to each user. For example, the number of other users may be displayed, e.g., in parentheses "( )" to indicate the number of Fhetch users available to be communicated with. In one embodiment, if a user taps on the displayed indicia indicating the number of available Fhetch users, e.g., "Fhetch Users (37 online)" or "352 Fhetch Users!", then the displayed user names may collapse (e.g., as in FIG. 13B), and the display may alternatively display the number of contacts of the user, and optionally the number of contacts that are not "Fhetch" users, e.g., "Contacts (85 non-Fhetch Users)" or "Contacts (85)." If the user taps on "contacts (#)" the contact names will collapse, as depicted in FIG. 13C. Re-tapping on "contacts (#)" or "Fhetch users (#)" will open the list of names again. If a person has at least one follower, the same will be true for that line "followers (#)" that can collapse or expand. In one embodiment, the default display setting may be the "followers (#)" collapsed at the top, followed by "Fhetch users (#)" with displayed names, followed by contacts (#) with displayed names.

Figure 14:
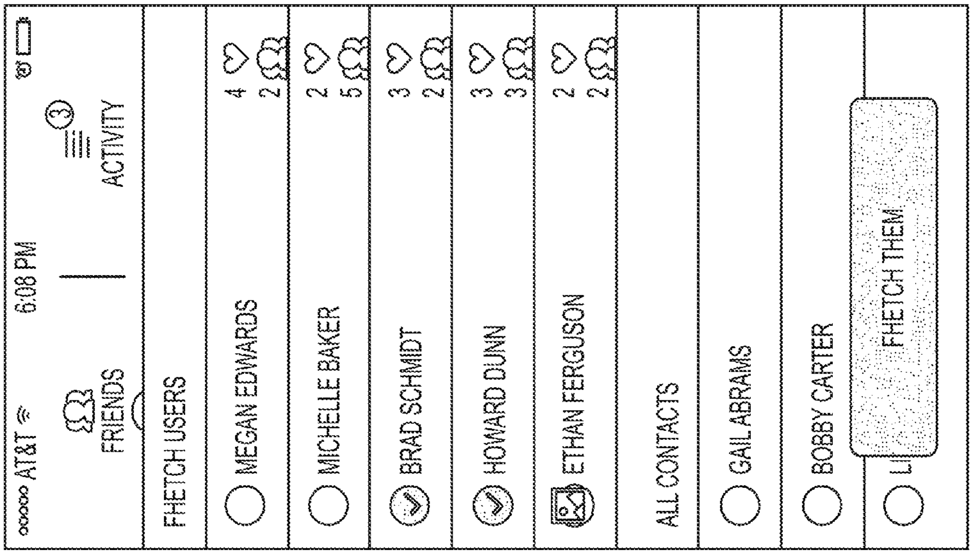

In one embodiment, as depicted in FIGS. 13A and 14, each listed fhetch user may have an icon (e.g. a heart with a number) indicating a number of likes the listed fhetch user has received from other fhetch users (e.g., total number of likes), and another icon (e.g., three heads with a number) indicating the number of other fhetch users the listed fhetch user is connected to.

In one embodiment, the "Friends" tab of FIG. 13A may be selectively customizable and sortable as desired by a user. For example, in one embodiment, when a user is viewing the "Friends" tab, a first tap on the Friends tab may sort the Fhetch users and followers by surname; another tap may sort the Fhetch users and followers by the number of total "likes" or "favorites" (or other indicia/selections) on the user's photos; another tap may sort the fhetch users and followers by total number of connected fhetch users in their network, another tap may sort the Fhetch users and followers by total number of followers; and another tap may sort the Fhetch users and followers by first name. It should be appreciated that, while the above sequence of taps is described as causing the above sequence of sorting, the above listed sort options may be arranged according to any sequence of taps. Advantageously, a user may be able to cycle through various sort options (e.g., first name, last name, number of likes, number of followers, and so on) by simply tapping the "Friends" tab.

As shown in FIG. 14, a user may selectively request to fhetch more than one user. In the depicted exemplary embodiment, a user may send a fhetch to one or more users with as few touches or inputs as possible. For example, once the user has selected which friends or contacts to fhetch, the user may simply select "Fhetch Them" to complete sending the request for multimedia content, such as a photo.

In one embodiment, users may be prevented from "fhetching" other users unless and until the fhetch-requesting user has viewed any existing photos sent by the user from whom another photo is desired. In such a scenario, the above-referenced displays of FIGS. 13A and 14 may be modified such that the "Friends" tab will show the depicted empty circle (or other similar icon) only next to the names/contact info for users that do not have a pending photo ready for viewing by the fhetching user. For any friends that do have one or more photos ready to be viewed by the fhetching user, those friends may have their corresponding empty circles (or similar icons) replaced with a photo icon or other similar indicia indicating that a photo is ready to be viewed. For example, in one embodiment, the friend's empty circle may be replaced with a photo icon and instructive text, e.g., "View Photo," for the friend having a photo ready to be viewed. If the fhetching user taps on such a friend (or associated photo icon or "View Photo" text) from the "Friends" tab, the fhetching user may be shown the photo, e.g., by being redirected to a photo screen, or by simply overlaying the photo on top of the "Friends" tab. Once the photo has been viewed, the fhetching user may be redirected to the "Friends" tab, where the indicia of the friend associated with the recently displayed photo may now be returned to the empty circle (or other similar indicia). As a result, the fhetching user may now be enabled to "fhetch" or request a photo from the other user, i.e., the friend (e.g., whether from the "Friends" tab or the "Activity" tab), because the fhetching user has viewed all other pending photos available from the other user/friend.

Figure 15:
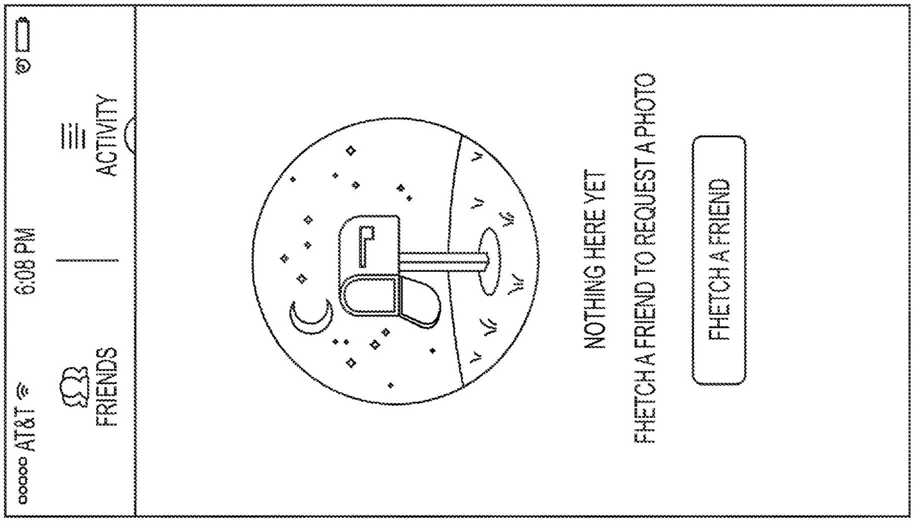

FIG. 15 depicts a screenshot of a user interface in which a user has not yet sent or received any requests or "fhetches."

Figure 16:
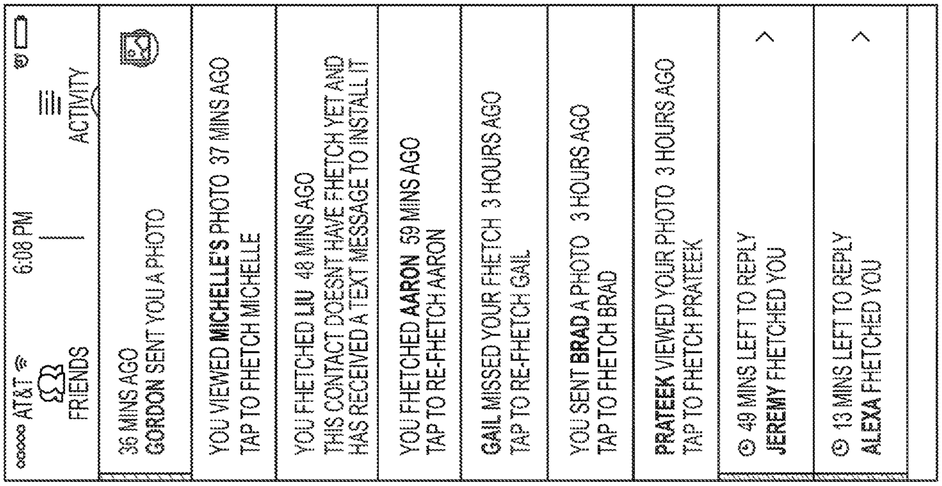

FIG. 16 depicts a screenshot of a user interface depicting activity of received requests or fhetches, sent requests or fhetches, viewed multimedia content, e.g., photos, etc. In one embodiment of the "Activity Tab" of FIG. 16, if a user has one or more followers, he or she will be shown a line at or near the top of the user interface that indicates to the user that the user's followers fhetched the user. Advantageously, there may not necessarily be an expiration for the fhetched from followers.

In one embodiment, as reflected in FIGS. 16 and 16A-E, when a user is in the activity tab, a first tap on the activity tab again will group all unviewed photos to the top, followed by the potentially existing line "Your followers fhetched you" (a batch of all followers) then by the rest of the lines sorted chronologically. A second tap on the activity tab may group all live fhetches to the top with the potentially existing line "Your followers fhetched you" at the top, and the rest of the lines being sorted out chronologically. A third tap on the activity tab may sort the unviewed messages to the top followed by the potentially existing line "Your followers fhetched you" then by the rest of the lines sorted chronologically. A fourth tap on the activity tab may bring back the activity timeline to its default chronological sorting with the potentially existing line "Your followers fhetched you" at the very top. In some embodiments, a tap on the activity tab may result in activities concerning a specific multimedia content (e.g., locations, videos, money, etc.) at the top. Again, as with the sorting of the Friends tab, it should be appreciated that, while the above sequence of taps is described as causing the above sequence of sorting, the above listed sort options may be arranged according to any sequence of taps. Advantageously, a user may be able to cycle through various grouping and sorting options (e.g., unviewed photos, live fhetches, etc.) by simply tapping the "Friends" tab.

The cells within the activity tab may be categorically divided into active cells and non-active cells. An active cell may inform the user about multimedia content that is yet to be seen, listened to, or played, or a message that is yet to be read. An active cell may also inform the user about a pending fhetch request for a multimedia content, location, or money. For example, as depicted in FIG. 16, an active cell may include the cell with the notifications "Jeremy fhetched you". In contrast, a non-active cell may be all cells under the activity tab that are not active cells. For example, as depicted in FIG. 16, a non-active cell may include the cell with the "You sent Brad a photo 3 hours ago."

Figure 16B:
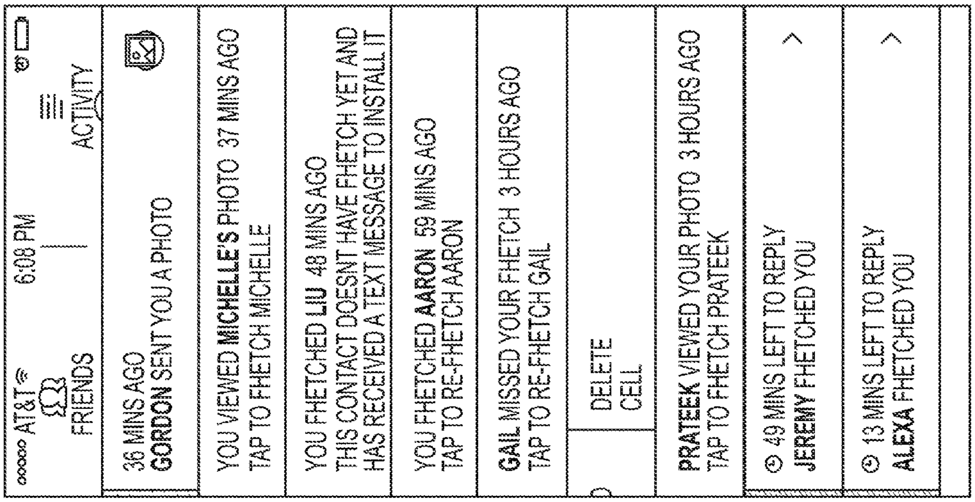
Figure 16A:
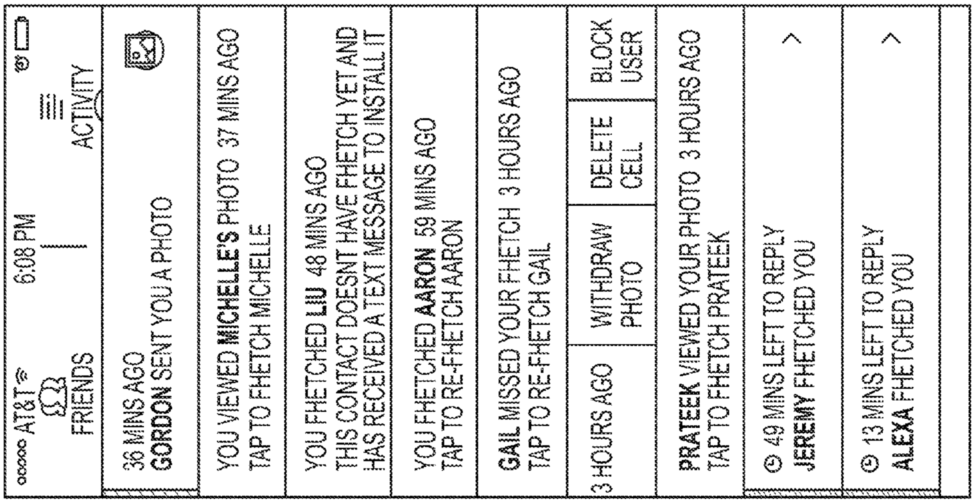

In one embodiment, if a user partially swipes a non-active cell from right to left, (e.g., swipes half-way), the user interface may allow the user to either delete that cell from the activity tab or block a user. In one embodiment, as depicted in FIG. 16A, if the non-active cell informs a user that a photo and/or other multimedia content has been sent (e.g., "You sent Brad a Photo 3 hours ago"), and the user partially swipes that non-active cell from right to left, (e.g., swipes half-way), the user interface may allow, in addition to the options of deleting the cell from the activity tab or blocking the user, the option of withdrawing the sent photo and/or other multimedia content. The sent photo and/or other multimedia content may be withdrawn by the sending user before the photo and/or other multimedia content has been seen, listened to, or played by the recipient user and/or user device. In another embodiment, the sending user may withdraw before the recipient user has acknowledged the receipt of the photo and/or other multimedia content. In yet another embodiment, the sent photo and/or other multimedia content may be withdrawn before an assigned time period.

Figure 16C:
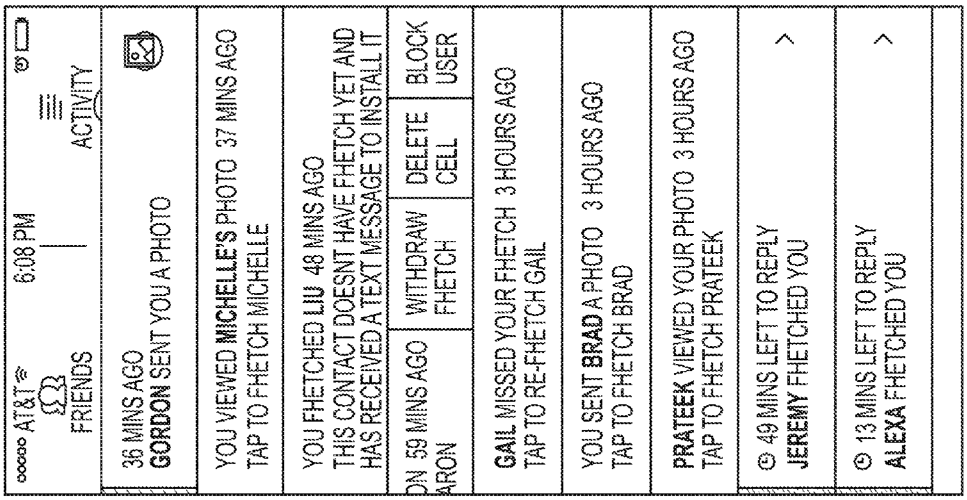

In one embodiment, as depicted in FIG. 16C, if the non-active cell informs a user of a fhetch request that the user has made (e.g., "You fhetched Aaron 59 minutes ago"), and the user partially swipes that non-active cell from right to left (e.g., swipes half-way), the user interface may allow, in addition to the options of deleting the cell from the activity tab or blocking the user, the option of withdrawing the fhetch request. The fhetch request may be withdrawn by the sending user before the fhetch request is seen and/or acknowledged by the recipient user and/or user device. In another embodiment, the fhetch request may be withdrawn before the recipient user responds to or complies with the fhetch request. In yet another embodiment, the fhetch request may be withdrawn before an assigned time period.

Figure 16D:
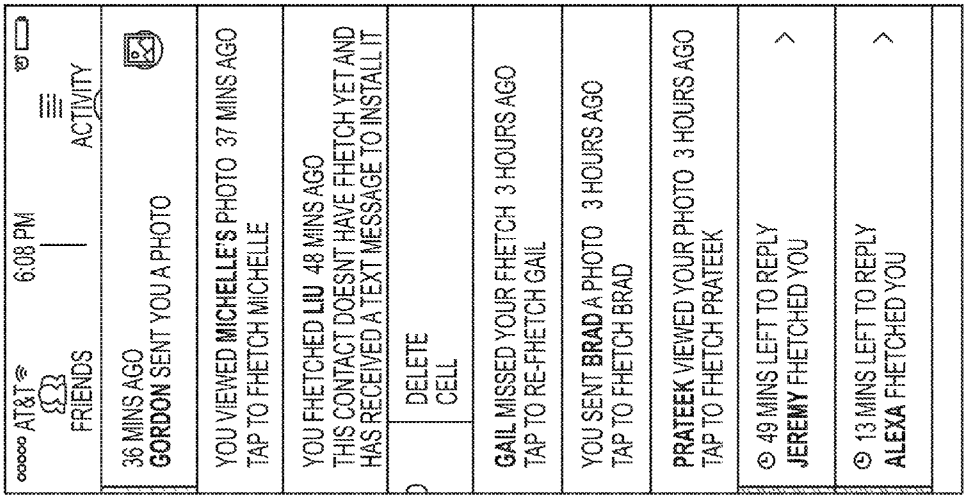

In one embodiment, when a user almost fully swipes a non-active cell from right to left (e.g., more than 75 percent of the way through), a notification and/or option of "delete cell" may appear. For example, as depicted in FIG. 16B, a non-active cell informing a user that a photo and/or multimedia content has been sent ("You sent Brad a photo 3 hours ago"), which has been almost fully swiped from right to left, may reveal a notification and/or option of "delete cell". Likewise, as depicted in FIG. 16D, a non-active cell informing a user that fhetch request has been sent ("You fhetched Aaron 59 minutes ago"), which has been almost fully swiped from right to left, may reveal a notification and/or option of "delete cell". A complete swipe of the non-active cell from right to left may delete the cell from the activity tab.

In another embodiment, the options and/or notifications for deleting a cell or blocking a user by swiping a cell from right to left may also be available for active cells.

Figure 16F:
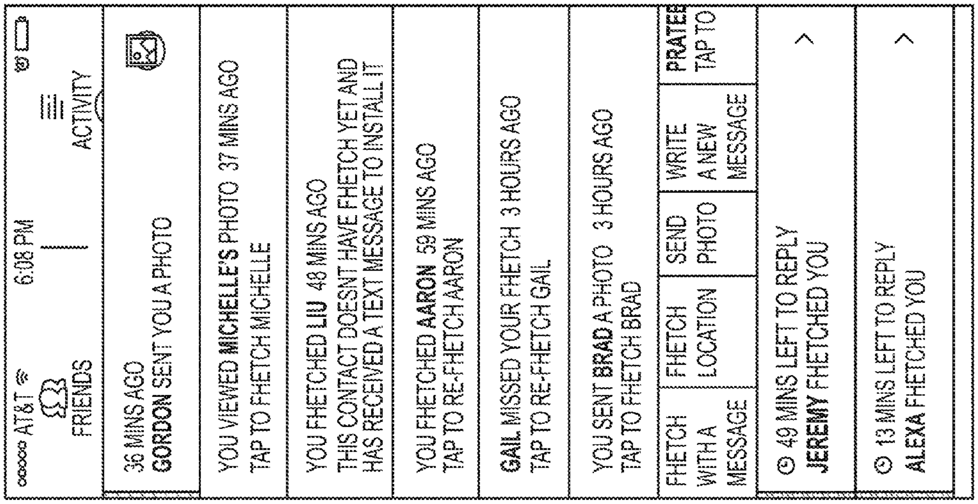
Figure 16E:
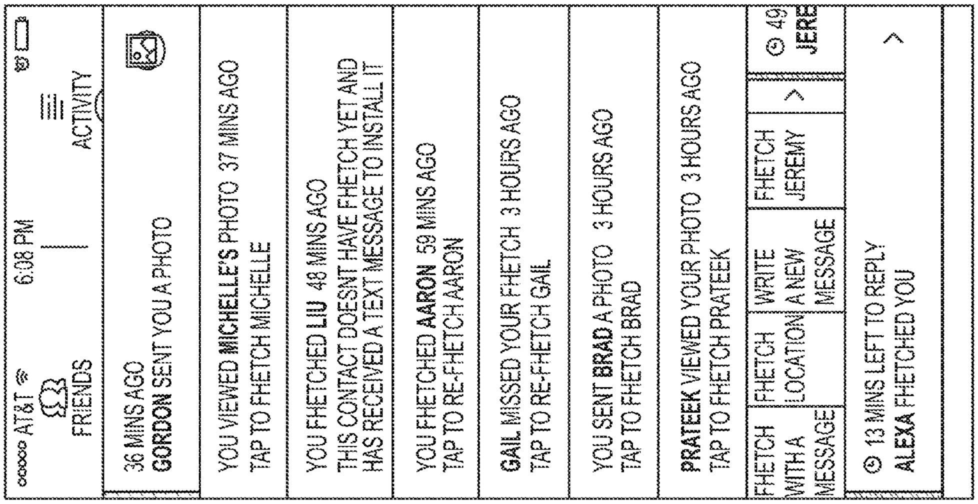

In one embodiment, when a cell is swiped from left to right, one or more of the following options may appear: fhetch with a message, fhetch location, write a new message, fhetch money, or a combination thereof. For example, as depicted in FIG. 16E, all four of the options may appear. If a first user selects an option to fhetch with a message, the new fhetch request by the first user selecting the option may replace any previous fhetch request, whether the new or previous fhetch request is with or without a message. If a first user selects the option to fhetch location from a second user, a new cell may be generated in the activity tab of the user interface, indicating that a first user has fhetched the second user's location. If a first user selects the option to fhetch money from a second user, the second user may receive a notification that the first user requests money from the second user.

In response to a fhetch request, a user may send a photo or other multimedia content by replying to and/or accepting the fhetch request. In some embodiments, as depicted in FIG. 16F, when a second user (e.g., Prateek) has viewed a sent photo or multimedia content already, swiping a cell from left to right partially may additionally reveal the option of sending a photo again (e.g., "send photo"). In some embodiments, a first user may be prevented from sending a subsequent photo or other multimedia content to the second user if the second user has not yet viewed a previously sent photo or other multimedia content by the first user. Additionally or alternately, a first user may be prevented from sending more than one unsolicited additional photo. If a first user replies to or accepts a fhetch request by sending a photo and/or multimedia content, sending the photo and/or multimedia content will eliminate from the first user device, the fhetch request from the second user receiving the photo and/or multimedia content.

In some embodiments, as depicted in FIG. 16G, if a first user has received a photo or other multimedia content (e.g., video, location, sound, etc.) from a second user in response to a fhetch request to the second user for the multimedia content, the first user may be prevented from making a fhetch request to the second user for the same type of multimedia content (e.g., photo, video, location, sound, etc.) without first viewing, listening to, or playing the received multimedia content. Thus, as depicted in FIGS. 16 and 16G, if the first user has received a photo from Gordon, and the first user has not viewed the photo yet (e.g., by tapping the cell "Gordon sent you a photo"), swiping the cell notifying the user of the received photo would not yield the option of sending Gordon a fhetch request for a photo. In another embodiment, a first user may be prevented from writing a message to a second user if the first user has yet to read a previously received message from the second user.

In some embodiments, a first user may be prevented from sending a second user a fhetch request for any multimedia content, even if the multimedia content that the first user has received from the second user and has yet to view, listen to, or play, is a form that is different from the multimedia content that the first user wishes to request from the second user.

In one embodiment, as depicted in FIG. 16H, partially or almost fully swiping a cell from left to right may generate options in the form of a pop up menu.

The ease and availability of options that may result from swiping a cell under the activity tab may help the user manage requests for multimedia content and/or facilitate the social sharing of multimedia content.

Figure 17A:
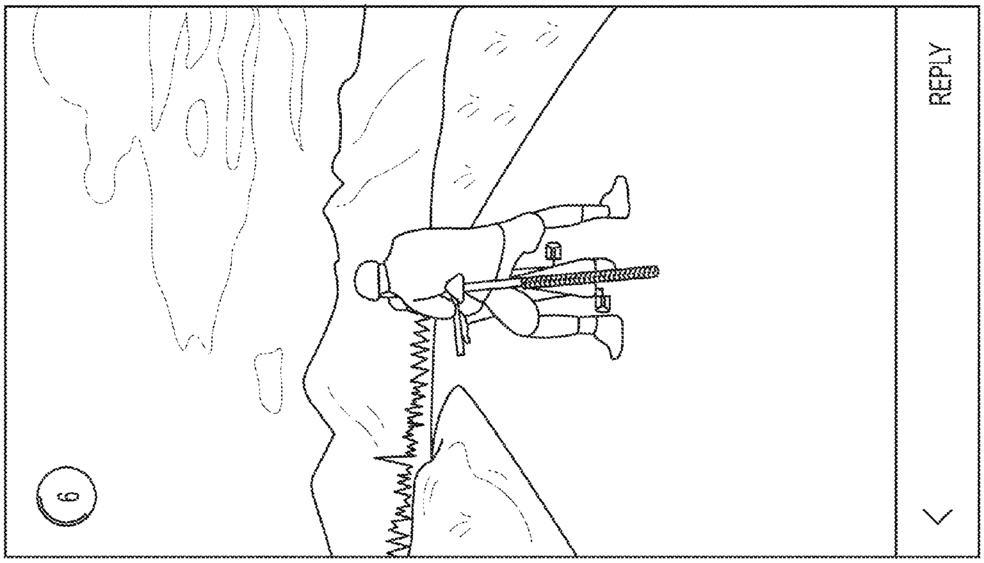

FIG. 17A depicts a user interface that may appear if a sender views multimedia content, e.g., a photo, sent in response to the sender's fhetch of a recipient. Specifically, whereas in the past, a user would only be able to view multimedia content that another user has selected to share and post, FIG. 17A illustrates when a first user is viewing a multimedia content (e.g., a photo) that the first user requested a second user to take and send back to the first user. As shown in FIG. 17A, in one embodiment, the fhetched photo or other multimedia content may have a time limit associated with it, and may also include a user element by which the sender of the request for content may "Reply" upon receiving the requested and fhetched content. By selecting "Reply", the first user may be able to send text to the second user, for example, as a comment on the multimedia content in a window similar to a text message to the second user.

Figure 17B:
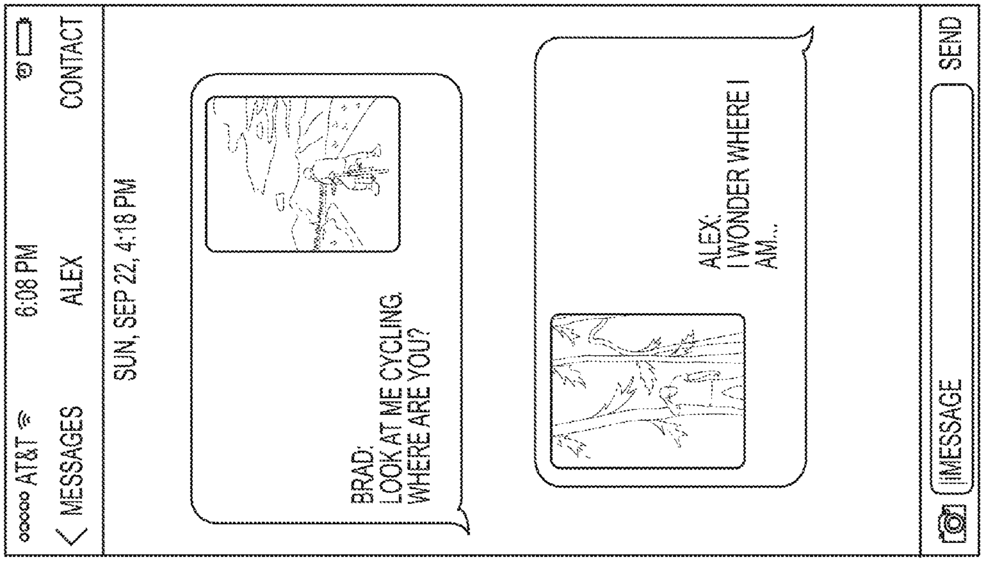

In one embodiment, a user may decide to select reply after a fhetched photo has expired due to a time limit and the photo became blurry as a result. In such an embodiment, as depicted in FIG. 17B, the reply option may result in a regular SMS conversation. A thumbnail version of the blurred photo associated with the most recent fhetch request may be shown within each text box or next to each text to identify the user involved in the conversation. In some embodiments, a user may enter text directly into the text box. In some embodiments, an SMS and/or text message of a conversation between users of the fhetch app may exist within the fhetch app (e.g., in a "history" or "past conversations" section of the fhetch app). In one embodiment, if a user decides to read an incoming SMS or text message from a second user but decides not to reply, the entire conversation between the first user and the second user that includes the text may disappear, and a notification may appear in the activity tab of the first user notifying that the first user has read the second user's message.

Figure 18:
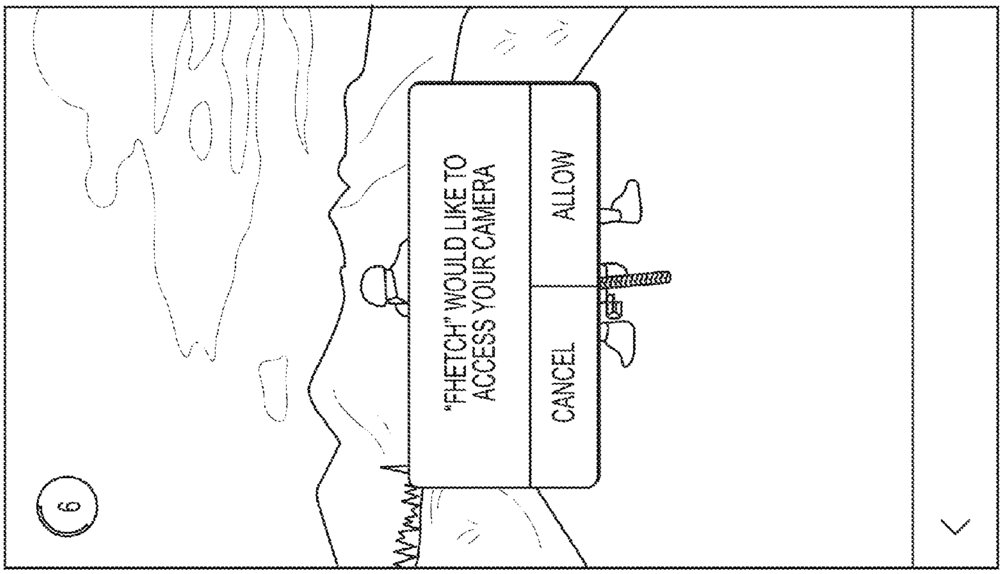
Figure 19:
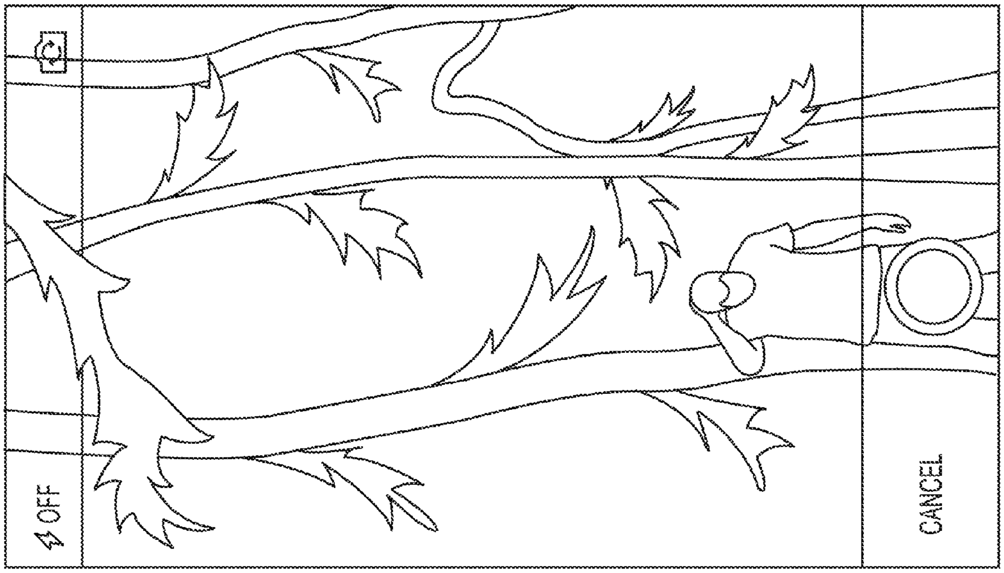

FIG. 18 depicts that the application may request a user for access to the camera of the user's mobile device. For example, if a first user accepts a request for a photo from a second user, the UI of the first user may prompt a window, as depicted in FIG. 18, asking the user whether to allow the Fhetch app to access the user's camera. The first user may accept the Fhetch app to access the first user's camera and allow the Fhetch app to take a photo, as shown in the screenshot of FIG. 19.

Figure 20B:
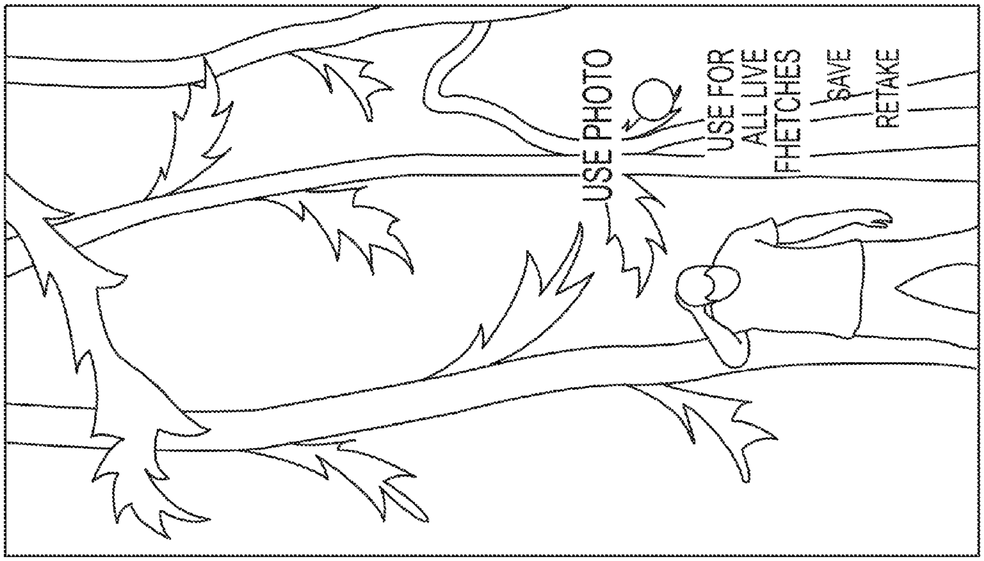
Figure 20A:
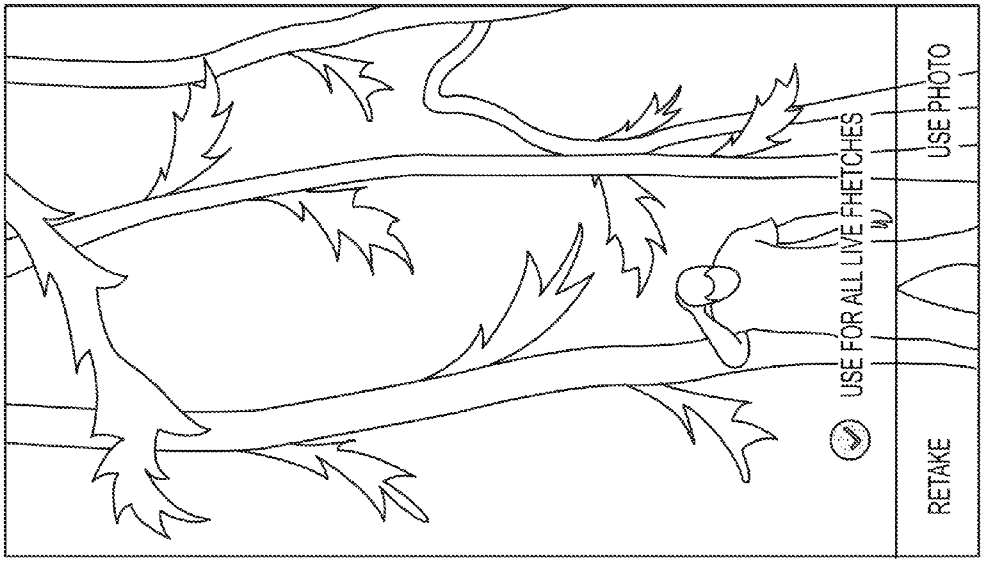

As shown in FIG. 20, once a user has taken a photo, they may either "Retake" the photo or "Use Photo" to respond to a request and/or reply. In one embodiment, the user may not be enabled to cancel the photograph. The user may be compelled to take at least one photo, which could potentially be of nothing, e.g., by blocking the camera. In one embodiment, the user may selectively request to use the taken photograph for all active or "live" fhetches, as shown in FIG. 20A. In one embodiment, the prompt for responding "To all live fhetch requests" may appear if there are currently more than one received live fhetch requests. The default setting for "Use for all live fhetches" may be unfilled (i.e. off mode). If the fhetchee has the open camera mode and while he/she is taking the picture and receives a new fhetch request from another user, then the "Use for all live fhetch" option may then appear (unfilled). Specifically, if a user has multiple requests or fhetches pending, then the user may be given the option to use the taken photo for all fhetches, versus taking a different photo for each pending fhetch. Again, the application may enable the users to instead or additionally take and share video content, in addition to or instead of photographic content. Moreover, the application may enable streaming access to the other user's camera, at the behest of the requester, instead of at the traditional initiation of the potential sharer or streaming party (of course the sharing party's may require explicit permission). In one embodiment, when the fhetchee accepts the fhetch request and is currently in camera mode (preparing the photo), the status bar may change from "You sent [USER] a fhetch request" to "[USER] is taking a picture". If the fhetchee is in camera mode but decides not to take a picture and/or taps on "cancel," the status may revert back to "You sent [USER] a fhetch request."

In one embodiment, as depicted in FIG. 20B, if there is no text added to a photo and/or multimedia content that has been generated or retrieved, then once a photo and/or multimedia content has been generated or retrieved, the alignment of the buttons from top to bottom may be structured as follows: a button to “Use Photo”, a button to “Use For All Live Fhetches”, with an unfilled circle; a “Save” button; and, at the bottom, a “Retake” button. The said top to bottom alignment of buttons may be shifted to the right or left depending on the user’s handedness and/or preferred layout. In one embodiment, the button to “Use For All Live Fhetches” may be written in one or more lines so that the text does not interfere with the icons for the photography and/or videography application. In one embodiment, if there is text that has been added to a photo and/or multimedia content, the abovementioned buttons of “Use Photo”, “Use For All Live Fetches”, “Save”, and “Retake” may be aligned side by side at the bottom of the user interface, with the “Save” button positioned in between the “Retake” and “Use Photo” buttons. In one embodiment, the “Save” button will save the photo and/or multimedia content with or without the text but the said photo and/or electronic photo will not show buttons of the user interface (e.g, Retake, Use Photo, etc.).

Figure 21:
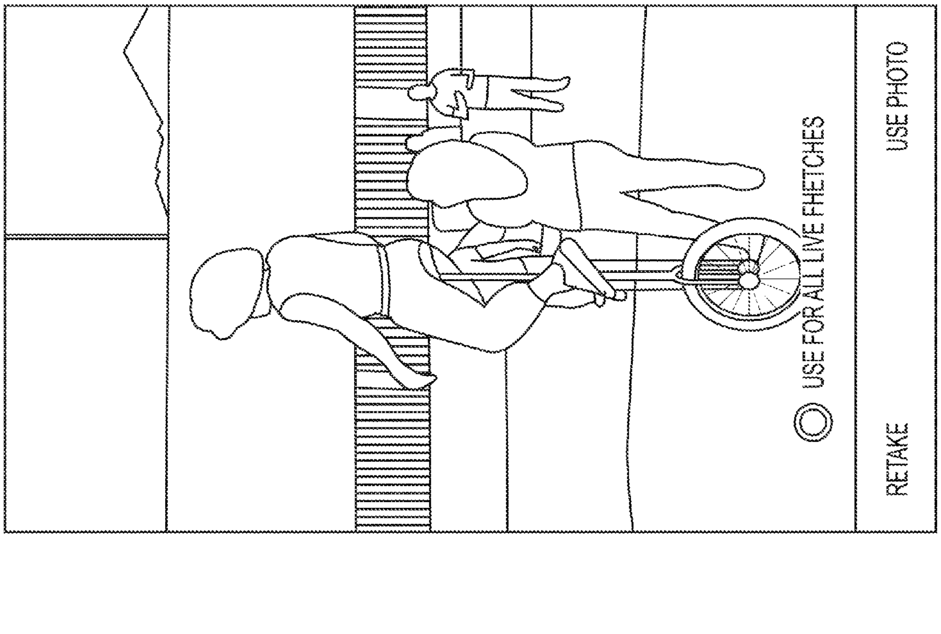

FIG. 21 is an example of another screenshot of an exemplary photo taken in response to a pending fhetch. Again, it should be appreciated that the application may additionally or alternatively grant access to the device photo library. However, in some embodiments, the application may block access to the library and may require users to share a brand new photograph in response to the other user’s request.

Figure 22:
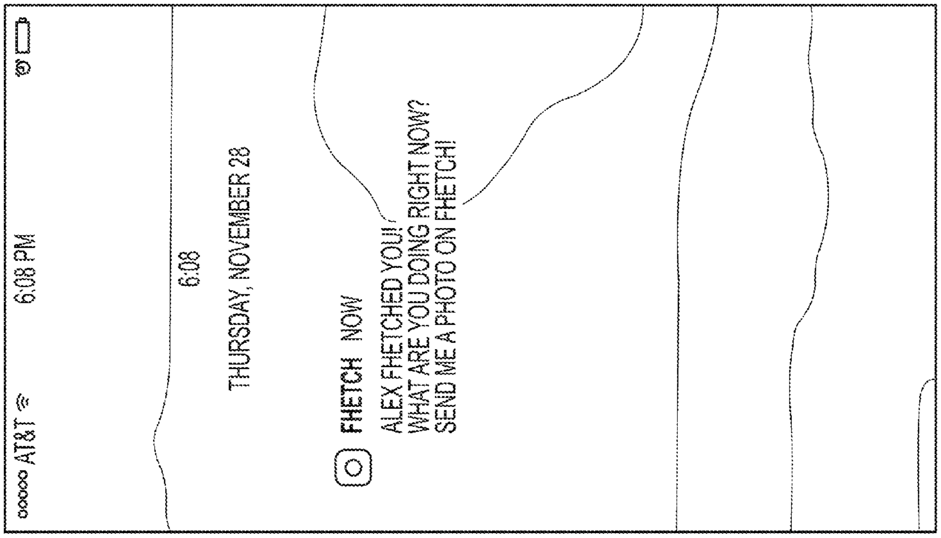

FIG. 22 is an example of a notification of a fhetch that is received at a recipient’s mobile device.

Figure 23:
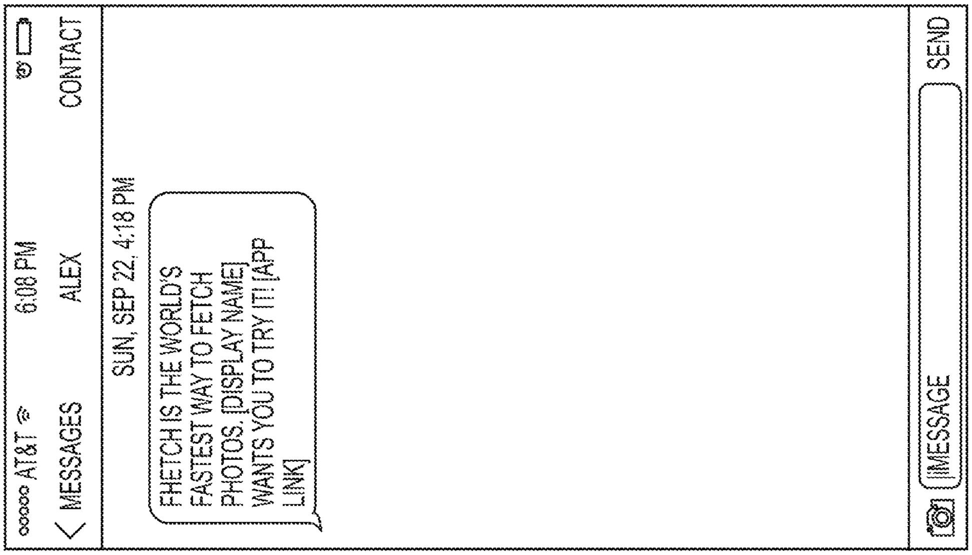

FIG. 23 is an example of a text message received to invite another user to download and use a mobile application consistent with the present disclosure. In one embodiment, once the fhetchee has received the invitation text message and has installed fhetch, the notification line may transform into a live fhetch request from the original fhetcher to the fhetchee and the fhetcher may receive a notification that the fhetchee is now a fhetch user.

Figure 24:
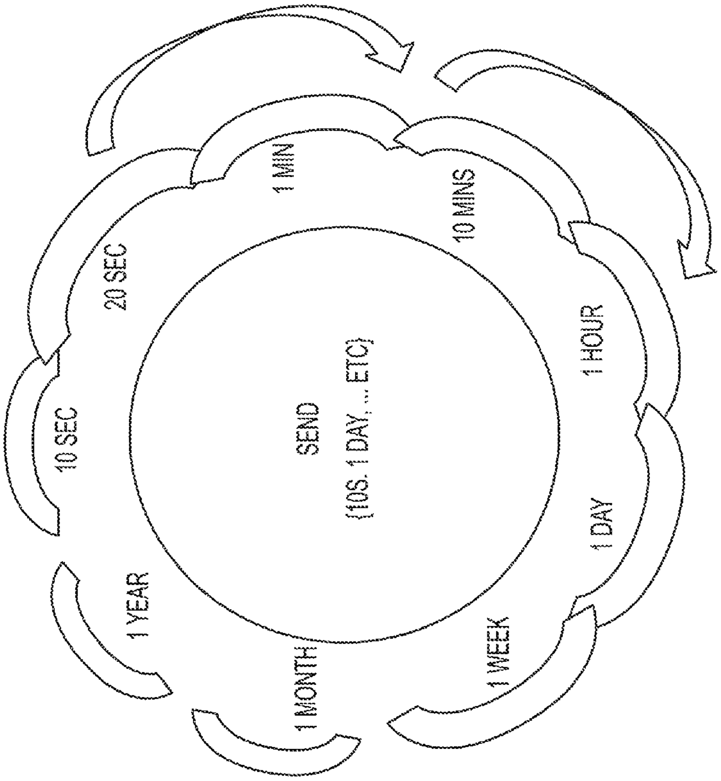

FIG. 24 depicts another exemplary user interface by which a user may set a time associated with a request or fhetch for multimedia content. For example, a user may configure the time for which the option to view a photo or multimedia content associated with a fhetch request may expire, or the time at which a fhetch request may expire. Specifically, in one embodiment, as shown in FIG. 24, a user interface may include a thumb or finger zone encircling a “Send” element. If the user taps on send, then the application may send a default photo or photo request associated with a default time, such as, for example, for 10 seconds. If the user taps and holds on the “Send” element, then the user interface may cause “10 seconds” to pop up. When the user removes their thumb or finger from the “Send” element, the photo may be viewed for 10 seconds by the receiver. If the user taps and holds the “Send” element, then 10 seconds may pop up, and then the user may swipe counter-clockwise to decrease a time a response can be viewed.

In a preferred embodiment, a user may be able to change the time associated with the expiration of a fhetch request, photo, or other multimedia content to predetermined and discrete time intervals, e.g., 10 seconds, 20 seconds, one minute, one hour, one day, etc.

In some embodiments, a user may be able to change the increment of time more precisely, for example, in 1 second increments. Further, the last increment of time may be from 1 second to 0.5 seconds. Additionally, if the user swipes clockwise, then the time increments increase by, for example, 1 second increments, up to, for example, 30 seconds. After that, the increments may increase to one minute, and may increase by one minute increments up to 30 minutes. After that, the increments may increase to one hour, and may increase by one hour increments up to 24 hours, after that the increments may increase to one day increments up to 31 days, and then increments may increase to one month increments up to 12 months. Time increments may then increase to one year increments, and so on. In one embodiment, clockwise increases a lifetime of a response, and counter-clockwise decreases a lifetime of a response. The lifetime may be displayed and when the user removes his finger from the “Send” element, the response may be sent with the displayed lifetime. Alternatively, the depicted user element may be associated with setting a duration or lifetime of a fhetch request. For example, a requestor may request that a potential sharer send the requestor a photo, but only if the potential sharer sends the photo within, say, one minute.

Figure 26:
FIG. 25-28 are screenshots of exemplary user interfaces of a mobile application for sharing text along with a photograph, such as in the form of speech or thought bubble, according to one or more embodiments of the present disclosure.
Figure 25:

After a requestor has fhetched a user to send a photo, that fhetched user may want to send text along with the picture. The user may send text through a default text box and/or text bar. In one embodiment, as shown in FIG. 25, the user can send text through a default speech bubble with the written text displayed inside the speech bubble. Once the user has finished typing the message inside the speech bubble, the user may resize the speech bubble, change the speech bubble’s font or colors, and/or make the speech bubble transparent or semi-transparent. If the photo includes a face, the user may allow the application to automatically link the speech bubble’s tail to the mouth through feature recognition, or the user may choose to manually move the speech bubble to an appropriate location on the picture. As shown in FIG. 26, the user can change the speech bubble into a thought bubble with a simple tap on the bubble, and change the thought bubble back to a speech bubble through another tap on the bubble.

Figure 27:
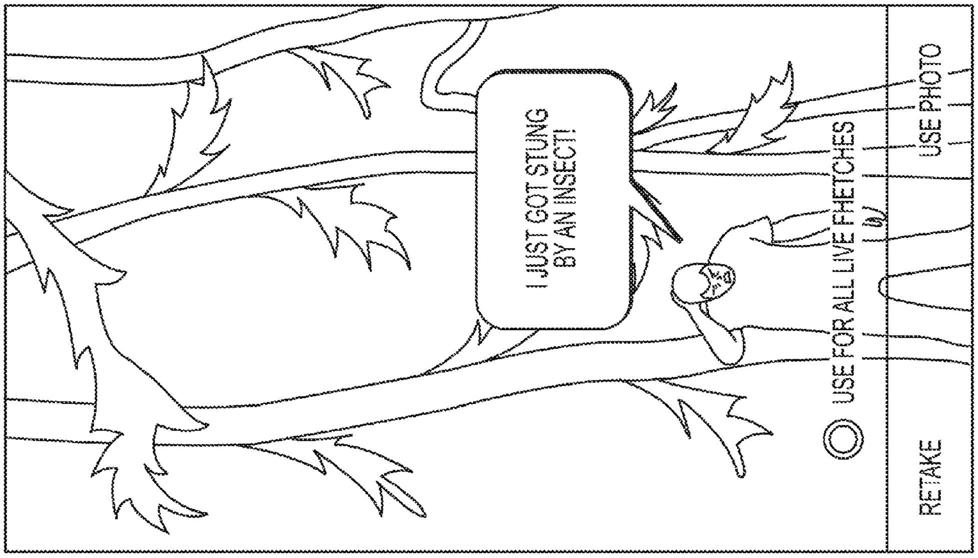
Figure 28:
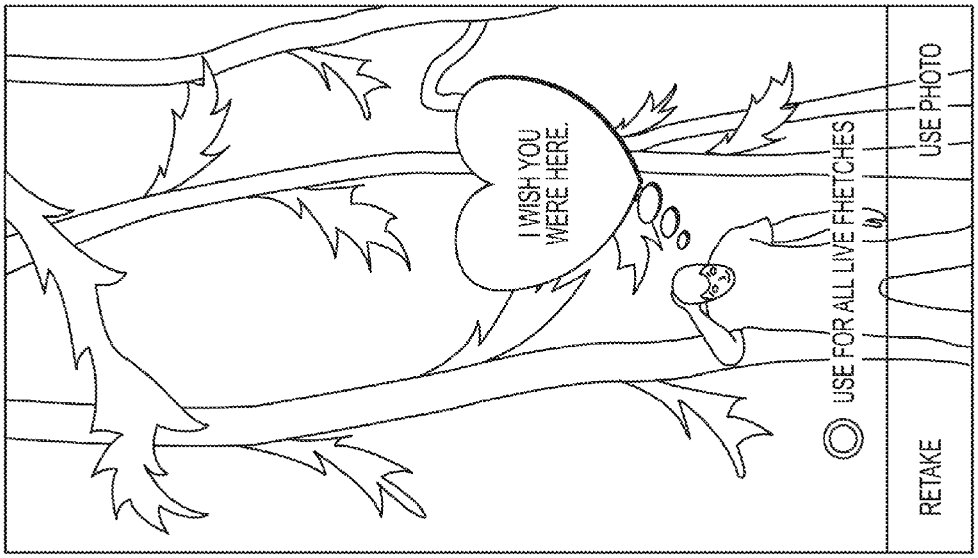

In one embodiment, if the user wants to add text by utilizing a speech or thought bubble, and the generated or retrieved photo includes a face, the application may use facial feature recognition to automatically select a particular speech or thought bubble from a variety of bubble designs depending on the emotion that is conveyed by the facial features. For example, as shown in FIG. 27, angry facial features could result in the application producing an explosive speech or thought bubble. In another example, as shown in FIG. 28, flirtatious facial features could result in the application producing a heart-shaped speech or thought bubble. The user may also be able to manually select a speech or thought bubble from a variety of bubble designs.

In one embodiment, the application may start a messaging thread if a user sends a text and another user replies to that text. This messaging thread can also be based on text sent or received within speech or thought bubbles.

FIGS. 29A, 29B, 29C, and 29D depict screenshots of exemplary user interfaces of a mobile device with a photography and/or videography application for setting up a layout that may be preferred by a left-handed or right-handed user, or a user desiring icons at the bottom of a screen.

Figure 29B:
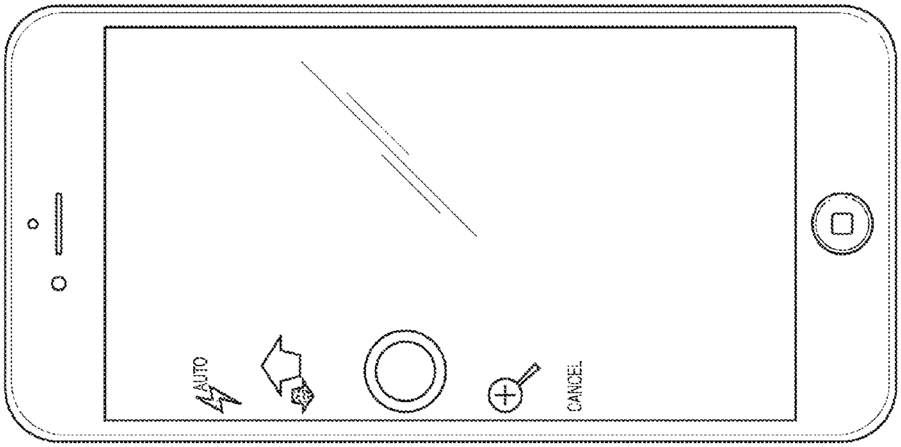
FIGS. 29A and 29B are screenshots of exemplary user interfaces of a mobile device with a photography application designed for right-handed and left-handed users, respectively, according to one or more embodiments of the present disclosure.
Figure 29A:
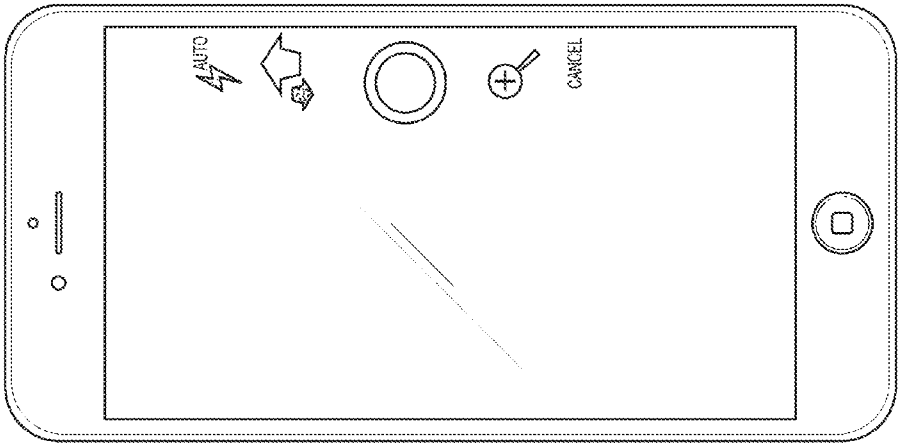

Specifically, FIG. 29A depicts a user interface that may be preferred by a right-handed user of the photography and/or videography application while FIG. 29B depicts a user interface that may be preferred by a left handed user of the photography and/or videography application. The suitability of a particular layout to a user’s handedness may be determined by one or more factors, including, but not limited to, which layout yields a better one hand grip of the mobile device, which layout allows the user to hold the mobile device closer to the center of gravity of the user's hand for the most amount of time so that the mobile device does not slip out of the user's hand, and/or which lateral side of the user interface is closer in proximity to a user's thumb. In one embodiment, the user may reconfigure a layout by dragging one or more icons of the photography and/or videography application toward the desired side of the user interface.

Figure 29D:
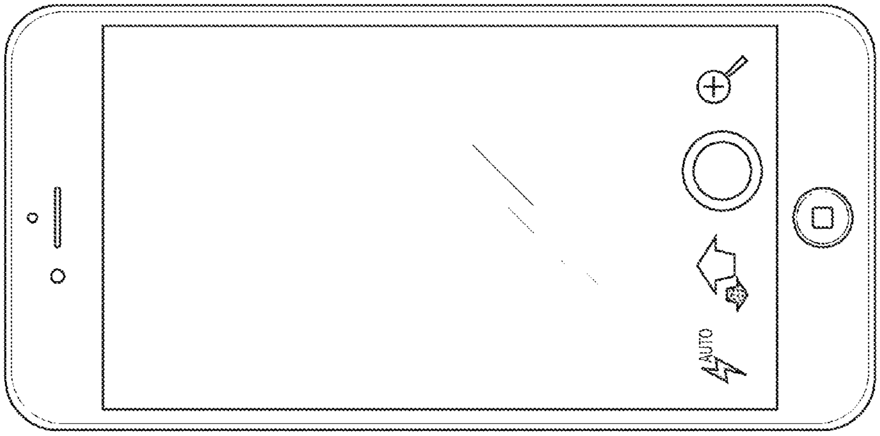
FIG. 29D is a screenshot of an exemplary user interface of a mobile device with a photography application with icons at the bottom of the screen, according to an embodiment of the present disclosure.
Figure 29C:
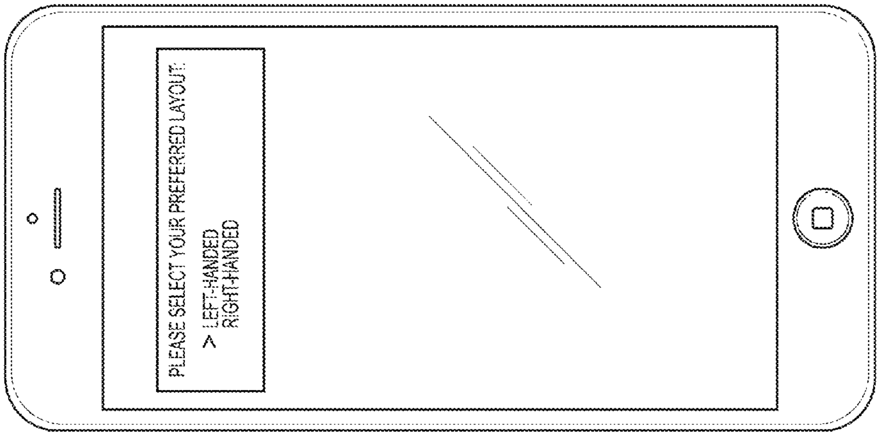
FIG. 29C is a screenshot of the photography application asking the user for his or her preferred layout, where layouts may be designed for left handed or right handed users.

Furthermore, FIG. 29C is a screenshot of the photography application asking the user for his or her preferred layout. In one embodiment, as depicted in FIG. 29C, the choices for preferred layout may be left-handed or right-handed. In one embodiment, the photography and/or videography application may sense or detect the user's handedness, and automatically configure the layout accordingly. For example, the photography and/or videography application may request the user to wait while the mobile device detects the user's handedness, and then may have the user verify the sensed or detected handedness. In another embodiment, the choices for layouts may include those for users that are ambidextrous and/or mixed-handed. In another embodiment, the choices for layouts may include those for users that prefer the icons of the photography application to be placed on a particular area of the user interface, regardless of the user's handedness. The choices for preferred layout may include left, right, center, top left, top right, bottom left, bottom right, and etc. For example, FIG. 29D depicts a user interface with icons at the bottom of the screen.

Figure 30C:
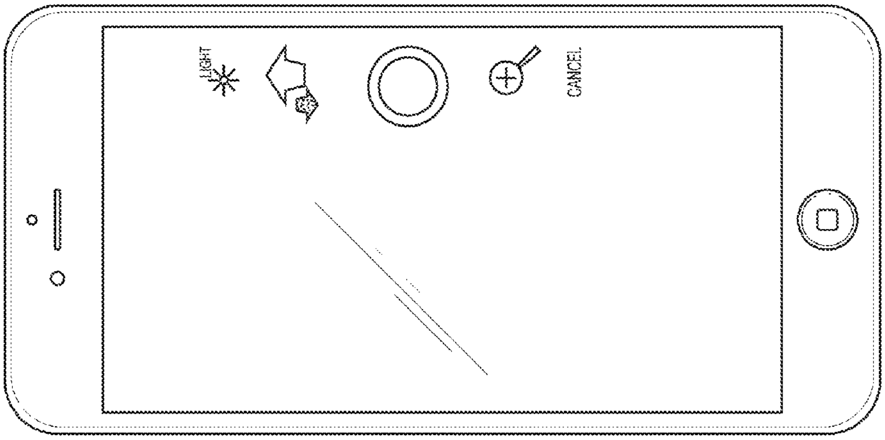
FIGS. 30A, 30B, and 30C are screenshots of exemplary user interfaces of a mobile device with the photography application where the user has switched the flash mode from its default "Auto" mode to "On", "Off", and "Light" mode, respectively, according to one or more embodiments of the present disclosure.
Figure 30B:
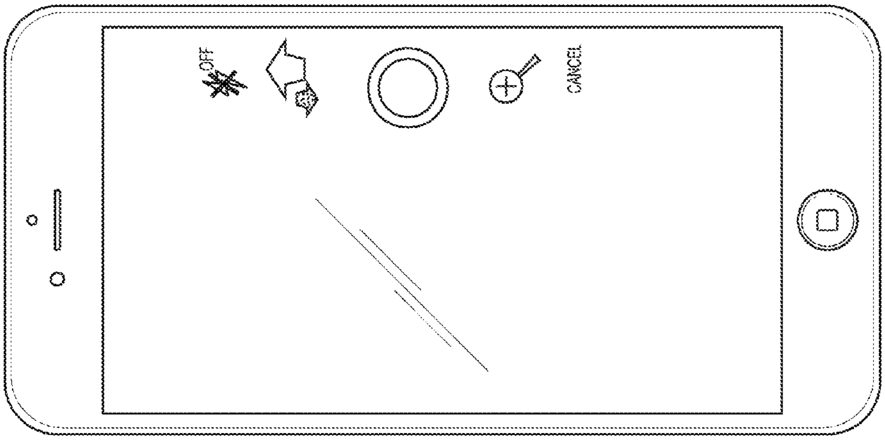
Figure 30A:
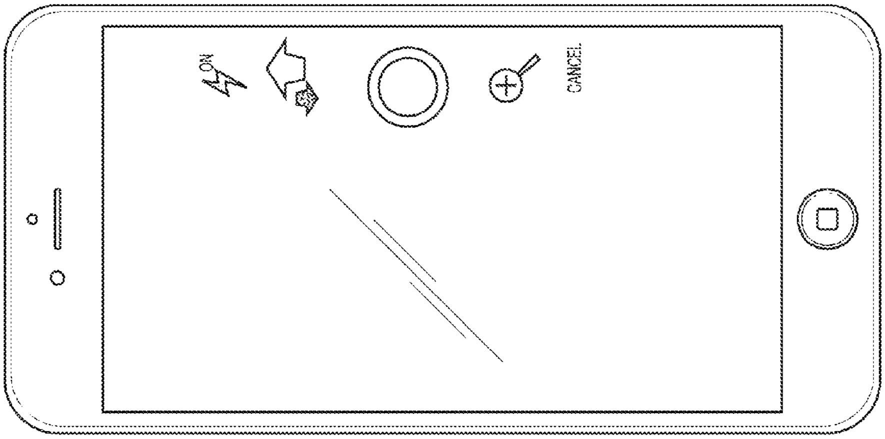

FIGS. 30A, 30B, and 30C are screenshots of exemplary user interfaces of a mobile device with the photography and/or videography application where the user has switched the flash mode from its default "Auto" mode to the "On", "Off", and "Light" mode, respectively, according to one or more embodiments of the present disclosure. The default flash mode, which is the "Auto" mode, is shown in FIGS. 29A and 29B as a lightning bolt with "Auto" written next to it. The flash mode indicates the durational characteristics of the light that may be used during photography or videography. During the default "Auto" mode, a light may flash for a quick duration of time (e.g., 1/1000 to 1/200 of a second) to help illuminate a scene when a photo or video is being taken, when illumination is necessary (i.e., the background illumination of the scene is insufficient). The photography and/or videography application may detect that it is necessary to turn on illumination when the environment in which the photo or video is taken is dark. In one embodiment, the user may reconfigure the intensity of light and/or the duration of the light used for one or more modes of the flash feature. In one embodiment, the user may configure the threshold of darkness for which illumination is necessary for the "auto" mode.

FIG. 30A depicts a screenshot of an exemplary user interface of a mobile device with the photography and/or videography application where the user has switched the flash mode from its default "Auto" mode to the "On" mode. As shown in FIG. 30A, the "On" mode may be represented with a lightning bolt with "On" written next to it. During the "On" mode, the flash feature may automatically turn on whenever a photo or video is being taken, regardless of the photo or video scene's background illumination.

FIG. 30B depicts a screenshot of an exemplary user interface of a mobile device with the photography and/or videography application where the user has switched the flash mode from its default "Auto" mode to the "Off" mode. During the "Off" mode, the flash feature may not activate when a photo or video is being taken, regardless of whether or not the scene of the photo or video has sufficient background illumination.

FIG. 30C depicts a screenshot of an exemplary user interface of a mobile device with the photography and/or videography application where the user has switched the flash mode from its default "Auto" mode to the "Light" mode. During the "Light" mode, a light that affixed to the mobile device is turned on. This said light may be used for the user's personal use as a flashlight and/or as illumination device for photography or videography regardless of whether the user is actually taking a photo or video. In one embodiment, the said light may be turned off after the flash mode is no longer in the "light" mode. In another embodiment, the said light may automatically turn off after an amount of time appropriate for conserving battery power.

Figure 31B:
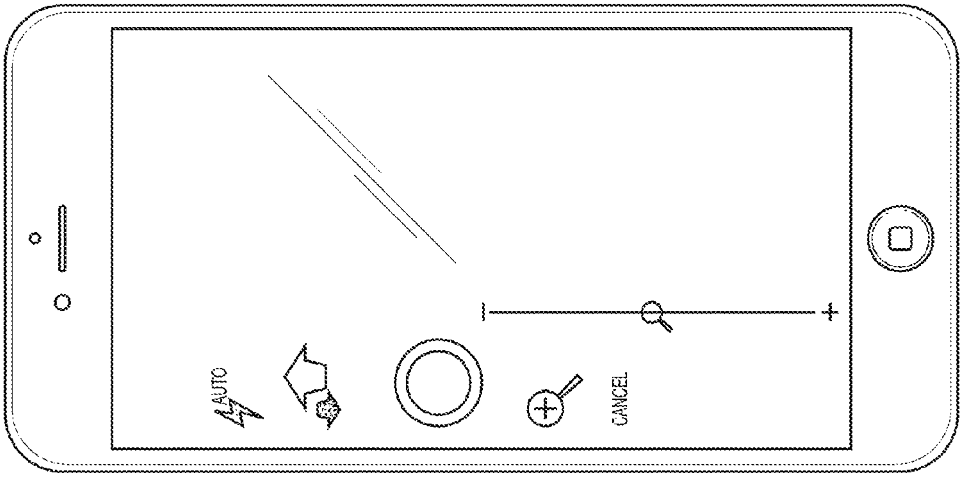
FIGS. 31A and 31B are screenshots of exemplary user interfaces of a mobile device with the photography application where the user has opened the zoom feature in a layout designed for a right handed and left handed user, respectively, according to one or more embodiments of the present disclosure.
Figure 31A:
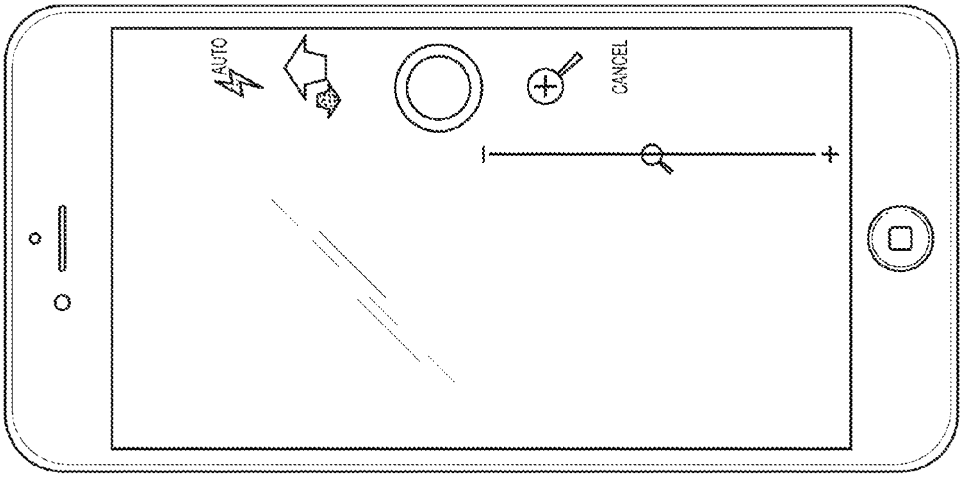

FIGS. 31A and 31B are screenshots of exemplary user interfaces of a mobile device with the photography and/or videography application where the user has opened the zoom feature in a layout designed for a right handed and left handed user, respectively, according to one or more embodiments of the present disclosure. A user may open the zoom feature by tapping an icon for the zoom feature, illustrated in FIGS. 31A and 31B as a magnifying glass with a plus symbol within the magnifying glass. Opening the zoom feature may result in a vertical bar, with an icon on the vertical bar denoting the current magnification. In one embodiment, as depicted in FIGS. 31A and 31B, a plus symbol at the bottom of the vertical bar may denote a rise in magnification, while a minus symbol at the top of the vertical bar may denote a decline in magnification, and an icon of a magnifying glass on the vertical bar denoting the current magnification. In one embodiment, a user may tap the plus and minus signs at either ends of the vertical bar to increase or decrease magnification, respectively. In another embodiment, the user may vertically slide an icon on the vertical bar to change the magnification. Specifically, FIG. 31A illustrates an opened zoom option in a layout designed for a right handed user, while FIG. 31B illustrates an opened zoom option in a layout designed for a left handed user. Since the user interface layout may be designed for the user's handedness or preference, the present disclosure provides the user with the possibility of using the zoom feature with the thumb of the same hand that is holding the mobile device. The abovementioned method of using the zoom feature allows the user to hold and use the mobile device with one hand, leaving the user's other hand free. The abovementioned zoom feature, which uses the thumb of the same hand that is holding the mobile device, may be used in addition to the traditional method for zooming on a mobile device, which employs two fingers sliding either closer to each other or apart from each other on the user interface screen, in order to zoom in or zoom out, respectively.

Figure 32:
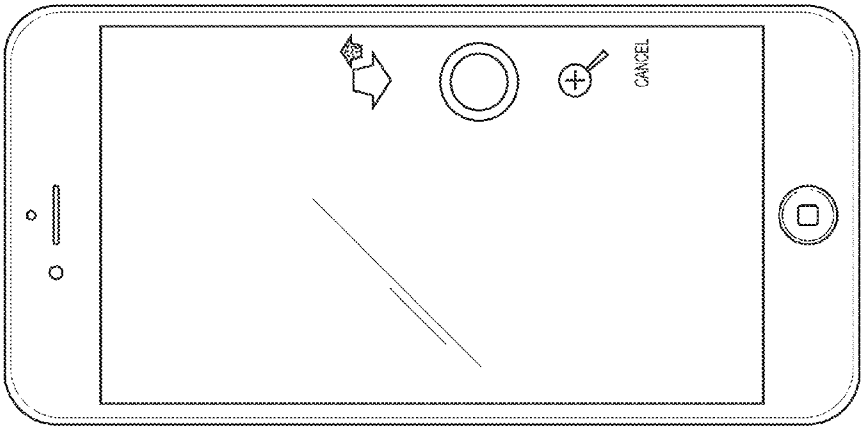
FIG. 32 is a screenshot of an exemplary user interface of a mobile device with the photography application where the user has turned on the "selfie" feature, according to one or more embodiments of the present disclosure.

FIG. 32 is a screenshot of an exemplary user interface of a mobile device with a photography and/or videography application where the user has turned on the "selfie" feature, according to one or more embodiments of the present disclosure. A "selfie" feature may allow the user to take a picture or record a video with the user interface screen facing the scene of the photo or video being taken, such as when a user takes a photo and/or video of oneself. A user may turn on the "selfie" feature by tapping an icon that toggles to the "selfie" mode from a "front view" mode. In one embodiment, as depicted in FIG. 32, turning on the "selfie" mode may cause the flash options to disappear. When the user toggles back to the "front view" mode, the flash options may reappear. In one embodiment, as depicted in FIG. 32, the icon that toggles between the "selfie" and "front view" modes may be represented as a pair of arrows pointing up and down. In one example, a "front view" mode may be represented with an enlarged up arrow, as illustrated in FIGS. 29A-C, 30A-C, and 31A-B, while a "selfie" mode may be represented with an enlarged down arrow, as illustrated in FIG. 32.

Figure 33:
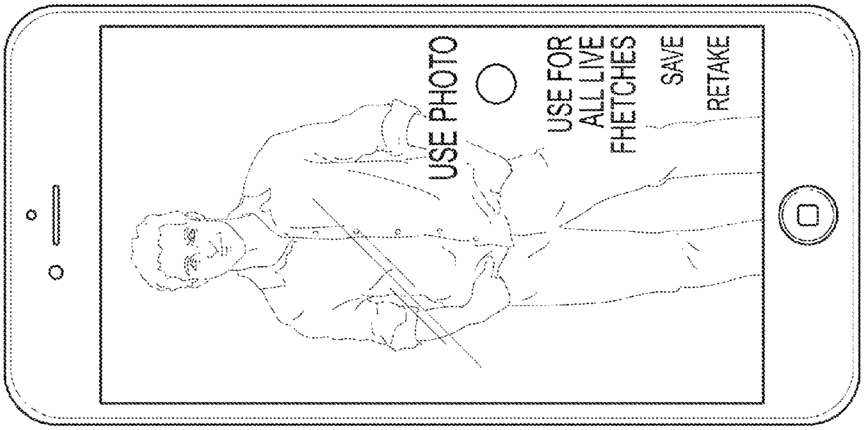
FIG. 33 is a screenshot of an exemplary user interface of a mobile device with a photography application layout designed for a right handed user after a user has taken a photo without a text accompanying that photo.

FIG. 33 is a screenshot of an exemplary user interface of a mobile device with a photography application layout designed for a right handed user after a user has taken a photo without a text to accompany that photo. In one embodiment, as depicted in FIG. 33, a layout designed for a right handed user may yield the following alignment of the buttons from top to bottom shifted to the right center of the screen: a button to "Use Photo", a button to "Use For All Live Fhetches", with an unfilled circle; a "Save" button; and, at the very bottom, a "Retake" button. In one embodiment, as depicted in FIG. 33, a layout designed for a left handed user may yield the said alignment of the buttons from top to bottom shifted to the left center of the screen. In one embodiment, as depicted in FIG. 33, the font for "Use Photo" may be larger than the font for "Use For All Live Fhetches." Likewise, the font for "Use For All Live Fhetches" may be larger than the fonts for "Save" and "Retake." The differences in font size may facilitate the social sharing of multimedia content.

In some embodiments, a user may change the buttons for taking a picture (and consequently the buttons that follow once the picture has been taken) by tapping and holding on one of the displayed buttons with a finger and dragging it to the left for the buttons to be aligned to the left side of the screen (e.g., for left handed users), to the right for the buttons to be aligned to the left side of the screen (e.g., for right handed users), to the bottom for the buttons to be aligned at the bottom of the screen, or to the top for the buttons to be aligned at the top of the screen.

Figure 34:
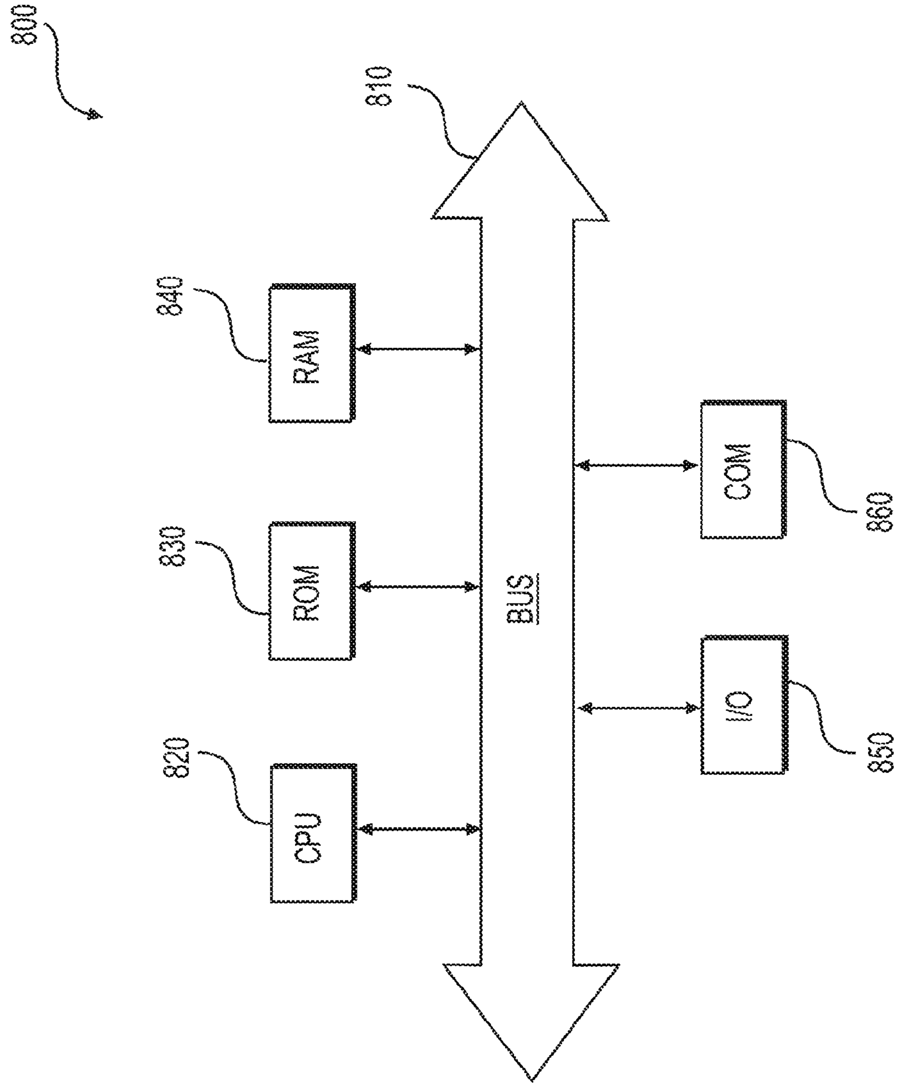
FIG. 34 is a block diagram of an exemplary computer system in which embodiments of the present disclosure may be implemented.

FIG. 34 provides a high-level functional block diagram illustrating an exemplary general purpose computer 800. Computer 800 may be used to implement, for example, any of application server 230A, message server 240A, content server 250A, or photograph server 260A of FIG. 2A, as described above. It is believed that those skilled in the art are familiar with the structure, programming and general operation of such computer equipment and as a result the drawings should be self-explanatory.

In an example, computer 800 may represent a computer hardware platform for a server or the like. Accordingly, computer 800 may include, for example, a data communication interface for packet data communication 860. The platform may also include a central processing unit (CPU) 820, in the form of one or more processors, for executing program instructions. The platform typically includes an internal communication bus 810, program storage and data storage for various data files to be processed and/or communicated by the platform such as ROM 830 and RAM 840, although the computer 800 often receives programming and data via network communications 870. The hardware elements, operating systems and programming languages of such equipment are conventional in nature, and it is presumed that those skilled in the art are adequately familiar therewith. Computer 800 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Any one or more features disclosed in the application may be construed as being potentially combined with any other combination of features disclosed in the application. For example, figures describing features on a right handed user interface may disclose the features for a left handed user interface.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing one or more requests for multimedia content between mobile devices, the method comprising:

receiving, from a mobile application of a first user device, a request by a first user to receive, from a second user, multimedia content that is presently unknown to the first user and that is requested to be created by the second user using a second user device, the request including an identifier of the first user device and an identifier of the second user device;

adding the request to a queue of pending requests associated with the second user device, wherein the queue of pending requests includes any requests received from one or more other user devices to receive multimedia content from the mobile application of the second user device, and wherein the queue also now includes the added request from the first user device to receive the multimedia content generated from the second user device;

displaying the queue of pending requests associated with the second user device on the mobile application of the second user device, the queue of pending requests including (1) the request from the mobile application of the first user device to receive multimedia content generated by the second user at the mobile application of the second user device and (2) any one or more other pending requests in the queue associated with the second user device;

enabling the second user to select a subset of requests from the queue of pending requests associated with and displayed on the second user device to send to the mobile application of the second user device, the subset of requests including (1) the request from the mobile application of the first user device to receive multimedia content from the mobile application of the second user device, and (2) any one or more other pending requests in the queue associated with the second user device;

enabling the second user, through the mobile application of the second user device, to generate a multimedia content using the second user device, in response to the selected subset of pending requests;

receiving, from the mobile application of the second user device, the generated multimedia content in response to the selected subset of pending requests to receive multimedia content, the subset of pending requests including the request from the mobile application of the first user device;

sending the generated multimedia content, over an electronic network, to the user devices associated with the selected subset of pending requests, the user devices including the first user device;

enabling the users associated with the selected subset of pending requests, including the first user, to see, listen to, and/or play the generated or retrieved multimedia content through the mobile applications of the user devices associated with the selected subset of pending requests, including through the first user device; and enabling a user of the first or second user device, through the mobile application of the first or second user device, to view notifications related to the requested, generated, sent, or received multimedia content, through a user interface that includes, at least, a list of the notifications related to requested, generated, sent, or received, multimedia content.

2. The method of claim 1, wherein the user interface enables the user of the user device to automatically arrange the list of notifications based on a chronological order, expiration of a multimedia content or request for multimedia content, the type of notification, the user device associated with a notification, or a combination thereof.

3. The method of claim 1, further comprising, one or more of:

removing from the list of the notifications related to requested, generated, sent, or received multimedia content, any one or more notifications related to subsequent requests, by a mobile application of a first user device, to receive multimedia content from a mobile application of a second user device if the queue of pending requests associated with the second user device includes a previous request by the first user device to receive multimedia content from a mobile application of a second user device;

removing from the list of the notifications related to requested, generated, sent, or received multimedia content, any one or more notifications related to subsequent requests, by a mobile application of a first user device, to receive multimedia content from a mobile application of a second user device if the queue of pending requests associated with the second user device includes a previous request by the first user device to receive multimedia content from a mobile application of a second user device;

removing from the list of the notifications related to requested, generated, sent, or received multimedia content, any one or more notifications related to previously sent multimedia content that was generated or retrieved by the second user device, to a first user device, in response to a request to receive multimedia content from a mobile application of the first user device, if the first user device has received a subsequently sent multimedia content that was generated or retrieved by the second user device, in response to a request to receive multimedia content from a mobile application of the first user device; or removing from the list of the notifications related to requested, generated, sent, or received multimedia content, any one or more notifications related to previously received multimedia content that was generated or retrieved by the second user device, to a first user device, in response to a request to receive multimedia content from a mobile application of the first user device, if the first user device has received a subsequently sent multimedia content that was generated or retrieved by the second user device, in response to a request to receive multimedia content from a mobile application of the first user device.

4. The method of claim 1, where the multimedia content to be requested or shared is a form of one or more of the following:

a photograph, including one or more of a forward or front-facing photograph, a backward or self-facing photograph, a combined forward or front facing and backward or self-facing photograph collage, a "selfie", a mobile device screenshot, a sequence of frame captures, any other photograph;

a video;

a sound clip;

an audio recording; a touch sequence;

text;

a heartbeat or other health measurement;

a mobile device location;

a mobile application or device status;

a song or part of a song;

a fund transfer;

or any other multimedia content that is of interest to the first user and that is producible by a mobile application of the second user device in response to a request for multimedia content.

5. The method of claim 1, wherein, enabling a user of the second user device to generate a multimedia content includes automatically generating the multimedia content using a mobile application of the second user device.

6. The method of claim 1, wherein, enabling a user of the second user device to generate the requested multimedia content includes allowing the second user to produce, discard, and/or replace a multimedia content.

7. The method of claim 1, wherein, one or more of, the request to receive multimedia content, or a generated or retrieved multimedia content received in response to a request to receive multimedia content, has an "expiration time," or any other parameter that optionally causes the request or multimedia content to be time limited or ephemeral in nature.

8. The method of claim 1, wherein, one or more of, the request to receive multimedia content, or a generated or retrieved multimedia content sent in response to a request to receive multimedia content, may be withdrawn by the user of the first user device, so as to prevent the user of the second user device from knowing of the request for multimedia content or to prevent the user of the second user device from seeing, listening to, or playing the generated or retrieved multimedia content.

9. The method of claim 1, further comprising, a means to rank, sort, and/or award users of a mobile application of user device based on the most sent requests to receive multimedia content, most received requests to receive multimedia content, and how often and/or how quickly users respond to requests to receive multimedia content.

10. The method of claim 1, wherein a response for requests to receive multimedia content may include, but is not limited to, blocking, silencing, ignoring, delaying, and/or muting requests to receive multimedia content.

11. The method of claim 1, wherein, adding the request, by a mobile application of a first user device, to receive multimedia content from a mobile application of a second user device to a queue of pending requests associated with the second user device, further comprises:

checking whether a user of the first user device has seen, listened to, and/or played all multimedia content that a user of the first user device is enabled to see, listen to, and/or play, the multimedia content having been received in response to a previous request to receive multimedia content from a mobile application of the second user device; and if a user of a first user device has not yet seen, listened to, and/or played all multimedia content received in response to a previous request to receive multimedia content from a mobile application of the second user device, preventing the addition of the request, by a mobile application of a first user device, to receive multimedia content from a mobile application of the second user device to the queue.

12. The method of claim 1, further comprising, enabling the recipient of the multimedia content to mark the multimedia content with one or more special designations, including, but not limited to, a "like," a "favorite," a "heart," a "star," or a "tag".

13. The method of claim 1, wherein generating or retrieving multimedia content may include accompanying the multimedia content with a speech or thought bubble that contains, one or more of, a text, photo, video, or a sound file.

14. The method of claim 13, wherein, the speech or thought bubble may be selected from a variety of emotive bubble designs, including, but not limited to, an explosive speech or thought bubble for conveying an angry speech or thought, a heart-shaped speech or thought bubble for a flirtatious speech or thought, or a default speech or thought bubble for a default speech or thought.

15. The method of claim 14, wherein, if the multimedia content is in the form of a photograph that includes a face, the method of claim 14 further comprises, one or more of: aligning, by the mobile application of the second user device, the tail end of the speech or thought bubble to the face, using facial feature recognition; or selecting, by the mobile application or device of the second user, an appropriate emotive bubble design, using facial feature recognition.

16. The method of claim 1, wherein, the user interface is aligned according to the handedness or preference of the second user using one or more of:

enabling the user of the user interface to select a left-handed or right-handed layout for the user interface, and aligning the mobile application icons, zoom feature, and/or option buttons vertically along the left or right side of the user interface, depending on whether the user selected a left-handed or right-handed layout; or sensing or detecting, by the mobile application of the user device, the handedness of the user, and aligning the mobile application icons, zoom feature, and/or option buttons vertically along the left or right side of the user interface, depending on whether the mobile application of the user device sensed or detected a left-handedness or right-handedness, respectively.

17. The method of claim 1, wherein the second user is identified from a contact list of the first user.

18. The method of claim 1, wherein the one or more pending requests in the queue are from one or more other users identified in a contact list of the second user.

19. A system for managing one or more requests for multimedia content between mobile devices, the system comprising:

a data storage device storing instructions for managing one or more requests for multimedia content between mobile devices; and a processor configured to execute the instructions to perform a method including:

receiving, from a mobile application of a first user device, a request by a first user to receive, from a second user, multimedia content that is presently unknown to the first user and that is requested to be created by the second user using a second user device, the request including an identifier of the first user device and an identifier of the second user device;

adding the request to a queue of pending requests associated with the second user device, wherein the queue of pending requests includes any requests received from one or more other user devices to receive multimedia content from the mobile application of the second user device, and wherein the queue also now includes the added request from the first user device to receive the multimedia content generated from the second user device;

displaying the queue of pending requests associated with the second user device on the mobile application of the second user device, the queue of pending requests including (1) the request from the mobile application of the first user device to receive multimedia content generated by the second user at the mobile application of the second user device and (2) any one or more other pending requests in the queue associated with the second user device;

enabling the second user to select a subset of requests from the queue of pending requests associated with and displayed on the second user device to send to the mobile application of the second user device, the subset of requests including (1) the request from the mobile application of the first user device to receive multimedia content from the mobile application of the second user device, and (2) any one or more other pending requests in the queue associated with the second user device;

enabling the second user, through the mobile application of the second user device, to generate a multimedia content using the second user device, in response to the selected subset of pending requests;

receiving, from the mobile application of the second user device, the generated multimedia content in response to the selected subset of pending requests to receive multimedia content, the subset of pending requests including the request from the mobile application of the first user device;

sending the generated multimedia content, over an electronic network, to the user devices associated with the selected subset of pending requests, the user devices including the first user device;

enabling the users associated with the selected subset of pending requests, including the first user, to see, listen to, and/or play the generated or retrieved multimedia content through the mobile applications of the user devices associated with the selected subset of pending requests, including through the first user device; and enabling a user of the first or second user device, through the mobile application of the first or second user device, to view notifications related to the requested, generated, sent, or received multimedia content, through a user interface that includes, at least, a list of the notifications related to requested, generated, sent, or received, multimedia content.

20. A non-transitory computer readable medium for use on a computer system containing computer-executable programming instructions for managing one or more requests for multimedia content between mobile devices, the method comprising:

receiving, from a mobile application of a first user device, a request by a first user to receive, from a second user, multimedia content that is presently unknown to the first user and that is requested to be created by the second user using a second user device, the request including an identifier of the first user device and an identifier of the second user device;

adding the request to a queue of pending requests associated with the second user device, wherein the queue of pending requests includes any requests received from one or more other user devices to receive multimedia content from the mobile application of the second user device, and wherein the queue also now includes the added request from the first user device to receive the multimedia content generated from the second user device;

displaying the queue of pending requests associated with the second user device on the mobile application of the second user device, the queue of pending requests including (1) the request from the mobile application of the first user device to receive multimedia content generated by the second user at the mobile application of the second user device and (2) any one or more other pending requests in the queue associated with the second user device;

enabling the second user to select a subset of requests from the queue of pending requests associated with and displayed on the second user device to send to the mobile application of the second user device, the subset of requests including (1) the request from the mobile application of the first user device to receive multimedia content from the mobile application of the second user device, and (2) any one or more other pending requests in the queue associated with the second user device;

enabling the second user, through the mobile application of the second user device, to generate a multimedia content using the second user device, in response to the selected subset of pending requests;

receiving, from the mobile application of the second user device, the generated multimedia content in response to the selected subset of pending requests to receive multimedia content, the subset of pending requests including the request from the mobile application of the first user device;

sending the generated multimedia content, over an electronic network, to the user devices associated with the selected subset of pending requests, the user devices including the first user device;

enabling the users associated with the selected subset of pending requests, including the first user, to see, listen to, and/or play the generated or retrieved multimedia content through the mobile applications of the user devices associated with the selected subset of pending requests, including through the first user device; and enabling a user of the first or second user device, through the mobile application of the first or second user device, to view notifications related to the requested, generated, sent, or received multimedia content, through a user interface that includes, at least, a list of the notifications related to requested, generated, sent, or received, multimedia content.

* * * * *